(12) United States Patent
Streuber et al.

(10) Patent No.: US 8,748,801 B2
(45) Date of Patent: Jun. 10, 2014

(54) DISCRETE WAVEFRONT SAMPLING USING A VARIABLE TRANSMISSION FILTER

(75) Inventors: Casey T. Streuber, Tucson, AZ (US); Kent P. Pflibsen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 835 days.

(21) Appl. No.: 12/890,677

(22) Filed: Sep. 26, 2010

(65) Prior Publication Data
US 2012/0074294 A1     Mar. 29, 2012

(51) Int. Cl.
*H01J 3/14*     (2006.01)
*G01N 21/86*     (2006.01)

(52) U.S. Cl.
USPC ..................... 250/216; 250/559.04

(58) Field of Classification Search
CPC .................. H01L 27/14621; H01L 27/14643; H01L 27/14609; G01J 3/51; G01J 3/513; H04N 3/155; G01B 11/00; G01B 11/24; G01B 11/002; G01B 11/255; G01B 11/306; G01B 11/26; D06H 3/125; B41J 13/32; B41J 9/46; G11B 7/0956
USPC ......... 73/66, 474, 482, 483; 250/221, 559.01, 250/559.04, 559.05, 559.07, 559.08, 250/559.22, 559.23, 559.37, 216, 226, 250/559.21; 369/44.32, 53.18, 53.19, 369/44.41; 359/238, 244, 245, 259, 280, 359/305, 308, 310, 315–318, 321, 322, 359/324; 349/57, 193; 356/489, 495, 356/510–516, 600–613
See application file for complete search history.

(56) References Cited

U.S. PATENT DOCUMENTS

| | | |
|---|---|---|
| 6,339,219 B1 | 1/2002 | Ishizuya |
| 6,404,970 B1 | 6/2002 | Gransden |
| 6,788,086 B2 | 9/2004 | Hantschel |
| 6,911,637 B1 * | 6/2005 | Vorontsov et al. ......... 250/201.9 |
| 7,990,543 B1 * | 8/2011 | Mello et al. .................... 356/512 |
| 2003/0147086 A1 * | 8/2003 | Rosencwaig et al. ......... 356/601 |
| 2006/0203251 A1 * | 9/2006 | Millerd et al. ................ 356/495 |

FOREIGN PATENT DOCUMENTS

JP     62-233709     * 10/1987     ............. G01B 11/26

OTHER PUBLICATIONS

Xiaomei Yu et al. "Design and fabrication of a high sensitivity focal plane array for uncooled IR imaging" J. Micromech. Microeng. 18 (2008) 057001.
Dooyoung Hah et al. "Low-Voltage, Large-Scan Angle MEMS Analog Micromirror arrays with hidden vertical comb-drive actuators" Journal of Microelectromechanical Systems, vol. 13, No. 2, Apr. 2004.
Yang Zhao et al. "Optomechanical uncooled infrared imaging system: design, microfabrication, and performance" Journal of Microelectromechannical Systems, vol. 22, No. 2, Apr. 2002.
Ben C. Platt et al. "History and Principles of Shack-Hartmann Wavefront Sensing" Journal of Refractive Surgery vol. 17 Sep./Oct. 2001 S573-S577.

* cited by examiner

*Primary Examiner* — Pascal M Bui Pho
(74) *Attorney, Agent, or Firm* — Eric A. Gifford

(57) ABSTRACT

A discrete wavefront measurement device uses a variable transmission filter (VTF) to decouple the dynamic range of tilt angle measurements in the wavefront from the spatial sampling resolution and the measurement sensitivity as regards the physics of the readout. This approach allows the discrete wavefront measurement device to be configured to a specified dynamic range, transverse sampling resolution and measurement sensitivity at low cost.

32 Claims, 16 Drawing Sheets

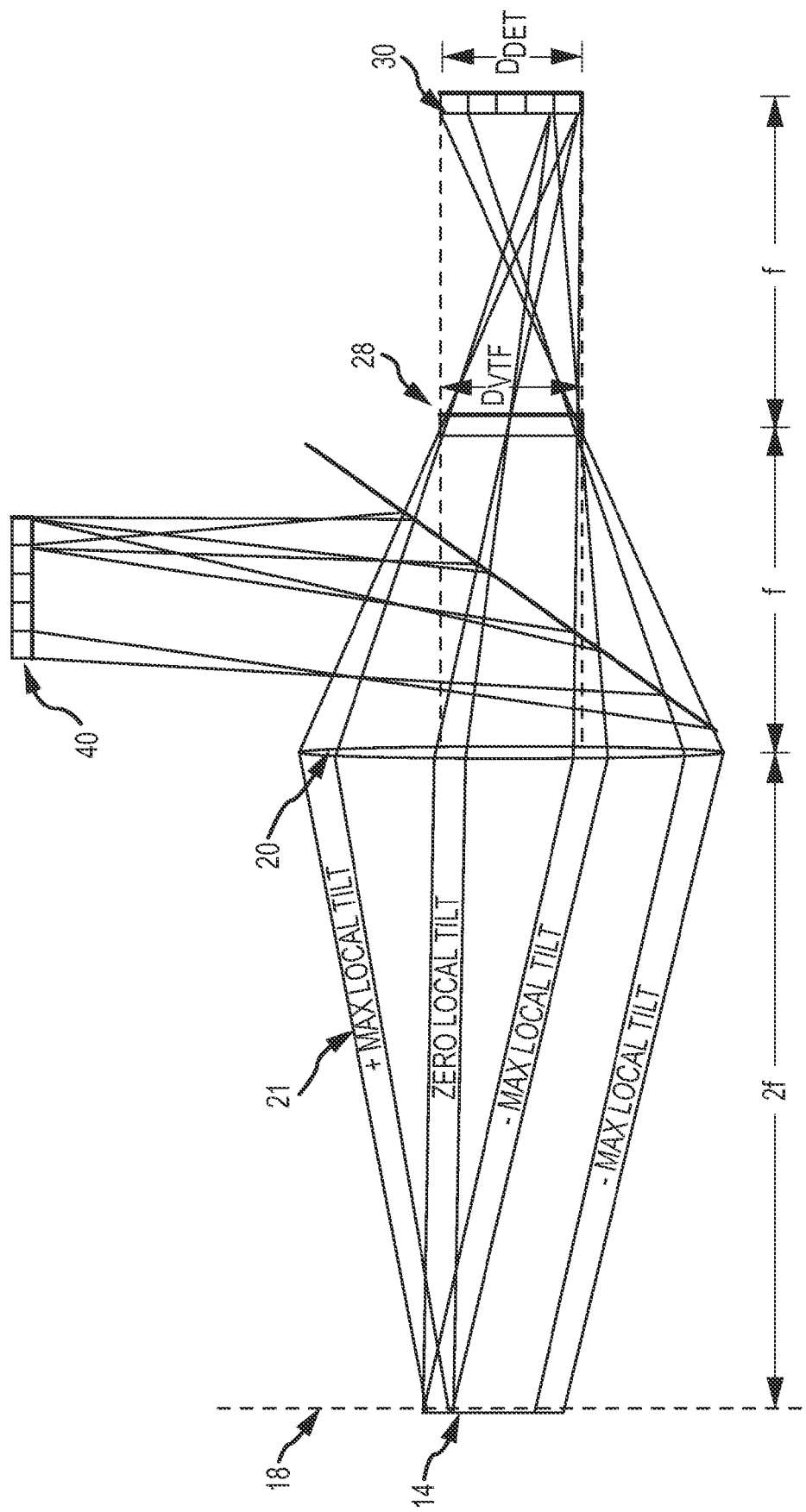

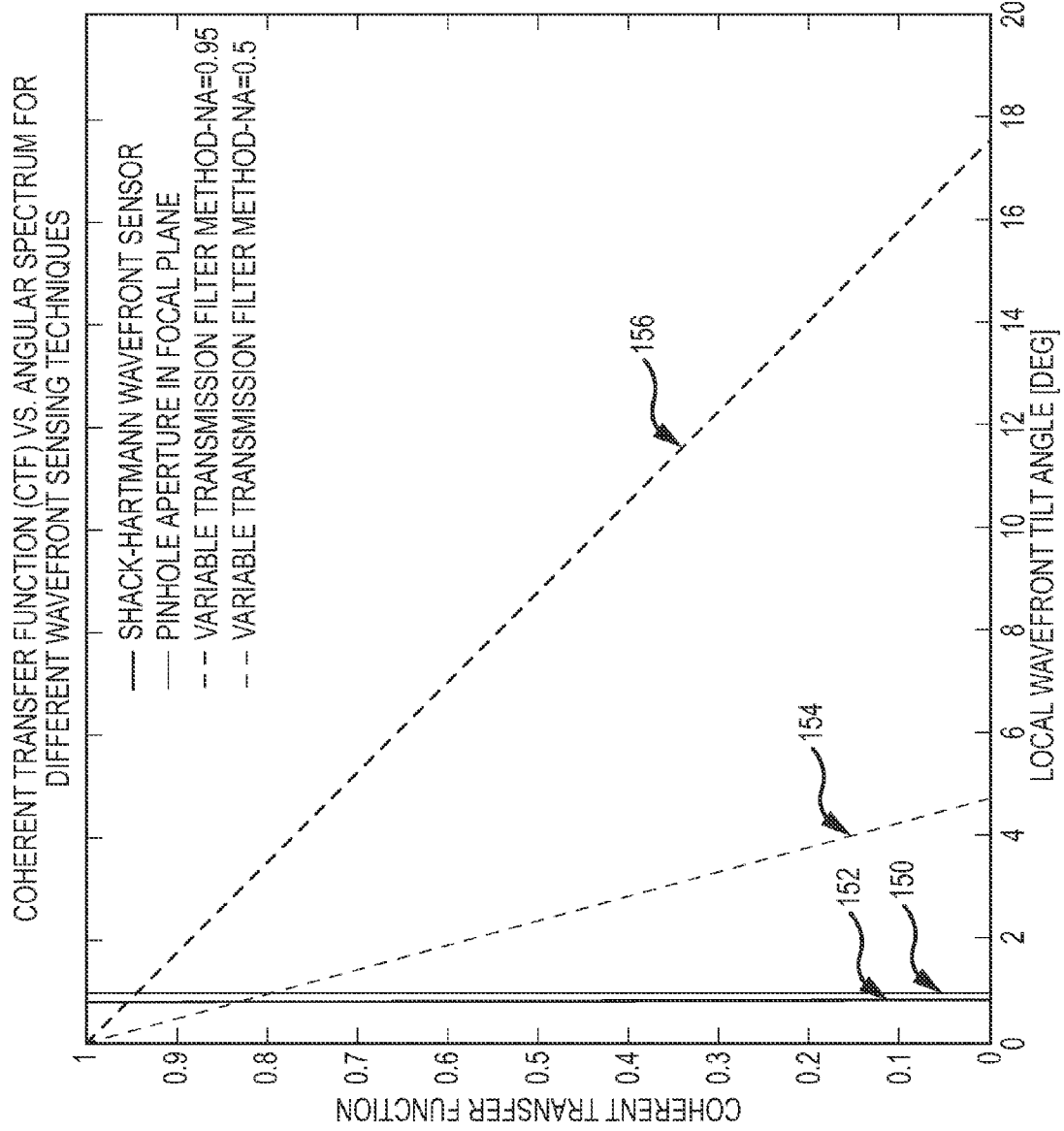

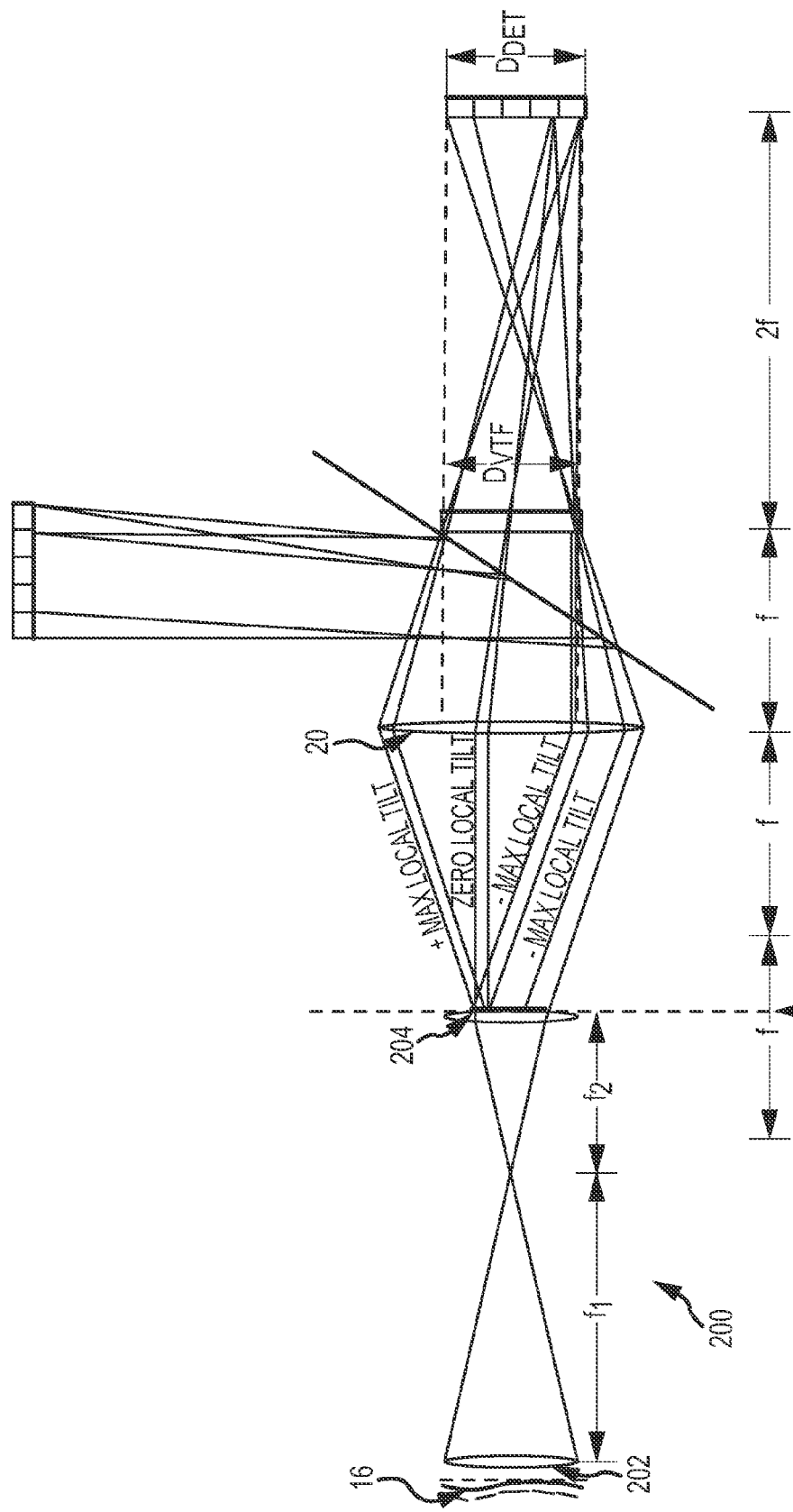

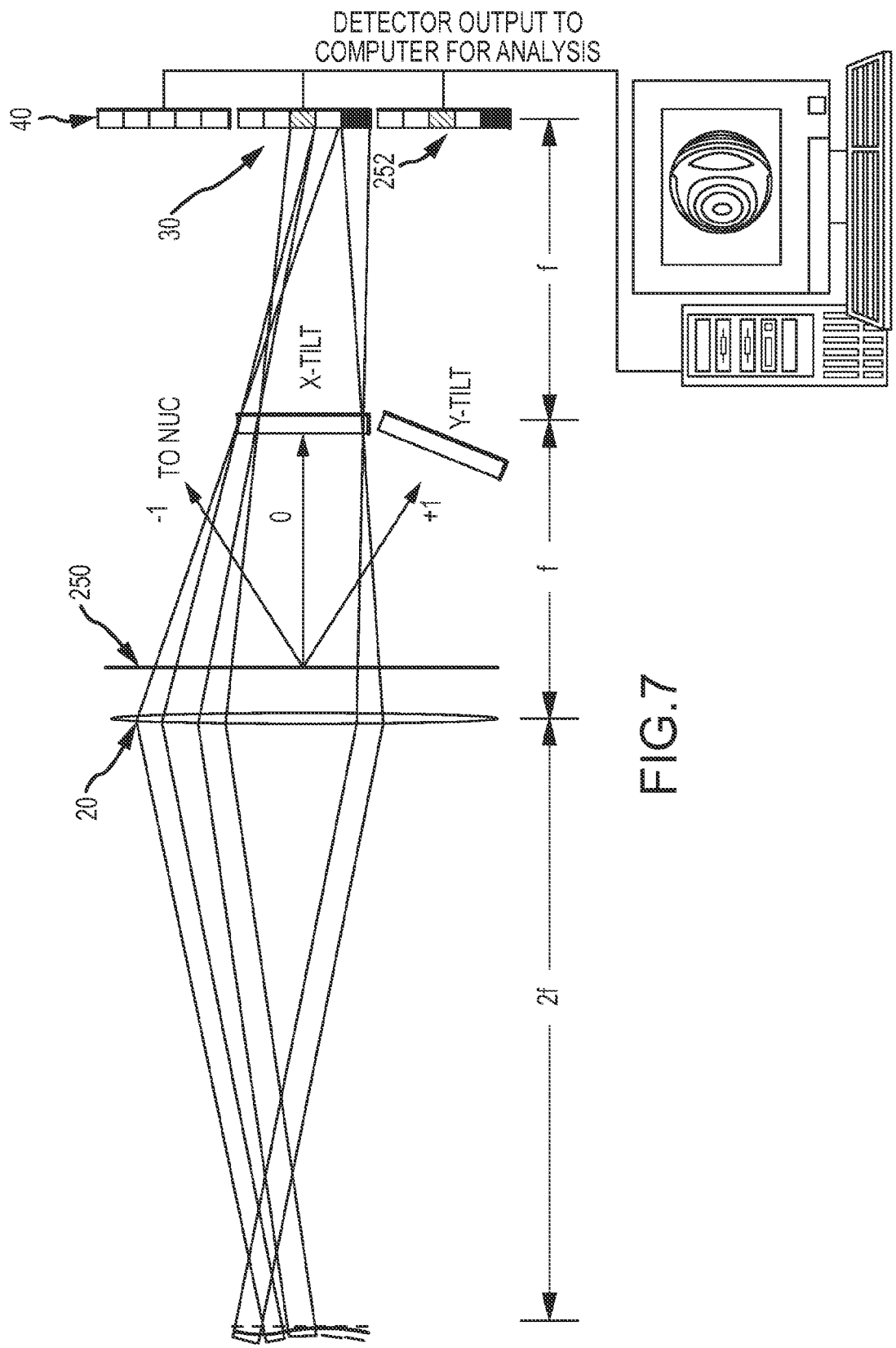

DISCRETE WAVEFRONT SAMPLING USING A VARIABLE TRANSMISSION FILTER

BACKGROUND OF THE INVENTION

1. Field of the Invention

This invention relates to characterizing an optical wavefront produced by an optical component or external source and more particularly to measuring the local tilt present in the wavefront.

2. Description of the Related Art

In many optical systems it is important to characterize the optical wavefront produced by a particular optical component or external source. The optical wavefront is defined as a continuous surface with constant optical path length from a source. In many cases, it is desired to measure the deviations in the actual wavefront from an ideal planar wavefront (if the source is at infinity) or alternatively from an expected wavefront of arbitrary shape.

A continuous measurement of the wavefront is typically performed with an interferometer. Interferometric techniques, typically involve expensive equipment and software programs that analyze interference fringe patterns, producing a measure of the wavefront deviation from a reference standard. Modern day practices use a charge-coupled device (CCD) to digitize and analyze the data; the reconstruction is not continuous, but the initial interference pattern is. An alternative approach is to discretely sample the wavefront directly. In this case, a sub-region of the continuous wavefront is sampled. If the sample is small enough (spatial sampling resolution high enough) for the given wavefront, the sampled sub-region will consist of a linear tilt at a particular angle. Stitching the samples back together produces a piece-wise linear fit of the slope present in the initial continuous wavefront. This piece wise linear fit can then be integrated to arrive at an estimate of the measured wavefront. One example of a device that performs this function is the Shack-Hartmann Wavefront Sensor.

Relatively recently, the desire to modulate an optical component such that the component can cancel out external wavefront aberrations (e.g. atmospheric, human tissue, etc.) has driven a requirement for systems that can measure the desired wavefront robustly and at the speed necessary for active control. Ideally, the measurement sensitivity should be comparable to standard interferometric techniques, with an additional requirement that the instantaneous dynamic range of the wavefront measurement must be larger than is available via interferometric techniques. The dynamic range of the system is defined as the maximum measurable tilt angle, while the measurement sensitivity is defined by the minimum measurable tilt angle. Finally the desired system needs to be relatively inexpensive and simple to implement. To date, almost all successful attempts to meet these requirements have been with a category of instruments referred to as wavefront sensors, the most prevalent being the Shack-Hartmann Wavefront Sensor.

The Shack-Hartmann Wavefront Sensor consists of an array of miniature lenslets used to sample the wavefront discretely. Each lenslet focuses a portion of the wavefront onto a sub-array within a detector (typically a CCD or CMOS device). The local tilt present in the wavefront manifests itself as motion in the focal plane, making the centroid of the image a measurement of the local slope of the wavefront for each lenslet. While this system degrades the spatial sampling resolution of the wavefront, the larger dynamic range makes it a simple and versatile system for conditions where an interferometer is not desired. Although the dynamic range is larger than the traditional interferometer, it is still limited by the diameter of the individual lenslets. Sophisticated algorithms have been developed to marginally improve dynamic range for these systems, but in general if greater dynamic range is desired, it must be accompanied by either an increase in the lenslet diameter or a decrease in the focal length. The former reduces the spatial sampling resolution while the later degrades the measurement sensitivity; both of these trades lead to degradation in measurement accuracy. Fabrication of the lenslet arrays, while dramatically improved in recent years is still a cost barrier for these systems.

Another more recent desire is to measure the tilt angle of MEMs based micro-mirror devices. Given the large required dynamic range and spatial sampling requirements typical of the MEMs systems, the family of Shack-Hartmann wavefront sensors is not a viable approach to this problem. In U.S. Pat. No. 6,339,219 Nikon proposes using a "pinhole" aperture, created with a Liquid Crystal Display (LCD), in the focal plane of a single lens to measure the tilt of individual pixels on an IR cantilevered array. The pinhole is used as a limiting aperture in the Fourier plane to impart an amplitude modulation related to the tilt angle. Because the pinhole diameter must be on the order of the central spot size in the diffraction pattern to modulate the transmitted amplitude, the dynamic range is still small, perhaps a degree to a degree and a half. In addition, with any binary edge filter, the system transfer function can only be modestly changed by the geometry of the limiting aperture. To achieve a larger useful dynamic range, Nikon proposes moving the pinhole aperture dynamically to cover the desired dynamic range of tilt angles, effectively translating the bandpass of the measurement system temporally. This is a severe limitation of the system, requiring time multiplexing of the input signal and complicated algorithms to stitch the images together.

Because of the limitations in both systems described above, additional methods of wavefront sensing have been pursued for a variety of applications. Another closely related technique typically referred to as wavefront curvature sensing, uses the same lenslet array, but measures changes in peak focal spot intensity, related to the local degree of curvature in the wavefront (i.e. the local wavefront curvature manifests itself as a defocus that spreads the energy across more pixels, reducing the measured peak amplitude). While this method allows a decrease in lenslet focal length to increase the dynamic range of the system with reduced impact to measurement sensitivity, the spatial sampling resolution of the wavefront is still limited by the required lenslet diameter. In addition, this system measures a second order effect and would not be sensitive to a simple first order wavefront tilt.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a cost-effective discrete wavefront measurement device that decouples the dynamic range of tilt angle measurements in the wavefront from the spatial sampling resolution and the measurement sensitivity as regards the physics of the readout. This approach allows the discrete wavefront measurement device to be configured to a specified dynamic range, spatial sampling resolution and measurement sensitivity at low cost. This approach provides a solution that will serve the adaptive optics and MEMs-based measurement communities immeasurably.

In an embodiment, a discrete wavefront measurement device for discretely sampling local tilt across different sub-regions of a continuous optical wavefront at an object plane comprises an optical system having an effective numerical aperture (NA). The optical system maps the local tilt of each sub-region of the optical wavefront to a spatial displacement at the back focal plane of the system and images the wavefront at a conjugate image plane beyond the back focal plane. A variable transmission filter (VTF) is positioned at or near the back focal plane. The VTF exhibits a variable transmission profile over an active region up to a cut-off angle imposed by the NA of the optical system, and the detector size, focal length, and the conjugate image plane distance from the back focal plane. The VTF attenuates the wavefront in accordance with the spatial displacements of each sub-region in the VTF's active region. A pixilated detector positioned at the conjugate image plane is responsive to the attenuated wavefront to discretely read out optical intensities across the different sub-regions of the wavefront to characterize the local tilts of the wavefront at the object plane. In some embodiments, the detector may be moved back-and-forth to change the field of view and/or dynamic range adaptively.

The spatial sampling resolution is determined by the spatial resolution (e.g. pixel pitch) of the detector and position of the conjugate image plane. The dynamic range is determined by the most restrictive of (a) the relationship between the detector size, focal length of the optical system and position of the conjugate image plane, (b) the NA of the optical system and (c) the active region of the VTF. Typically, the detector size and focal length are used to set the maximum detectable tilt angle, with the NA and VTF active region selected to match this dynamic range. The conjugate image plane location is used to manage the spatial resolution of the measurement. In an embodiment, the detector diameter equals the VTF active region to combine tilt angle mapping and imaging while maintaining the dynamic range. To achieve the dynamic range, the diameter of the lens is approximately three times the detector diameter. The detector and conjugate image plane may be positioned at twice the focal length to achieve a 1:1 magnification. The detector may be positioned beyond 2f to increase the dynamic range. An afocal wavefront compressor or expander may be positioned to compress or expand the wavefront prior to the optical system. Alternatively a zoom lens could be configured to perform the same task, allowing the system to adapt to a variety of measurement needs. This coupling system allows the wavefront to be sampled over the same spatial extent while also retaining the sampling resolution at the increased dynamic range, or achieve the same dynamic range with a smaller lens. The tilt measurement sensitivity is determined by the ratio of the dynamic range to the effective bit depth of the VTF and detector. The effective bit depth is controlled by a number of factors, but essentially is defined by the minimum resolvable amplitude difference and the maximum measurable amplitude. Although sensitivity is a function of dynamic range, it is functionally decoupled from the device physics because the sensitivity may be adjusted by controlling the effective bit depth of the detector and VTF.

In an embodiment, an optical element may be positioned in front of the VTF to direct a portion of the wavefront to a second detector to readout optical intensities to characterize the non-uniformity of the wavefront. These terms may then be used to provide non-uniformity compensation (NUC) for the measured local tilts.

In other embodiments, the discrete wavefront measurement device may include a computer responsive to the measured local tilts of the wavefront to compute one or more characteristic parameters of the wavefront and generate a feedback signal and an adaptive optic element responsive to the feedback signal to alter the wavefront. This element may be the device that generates the optical wavefront such as an analog micro-mirror array or may be a downstream device to correct for aberrations in the wavefront. The discrete wavefront measurement device may further include an optical element positioned after the VTF that diverts a portion of the wavefront to project an analog image of the attenuated wavefront.

The core discrete wavefront measurement device and one or more of the NUC, control feedback and analog image projection may be combined to service various MEMS-based or adaptive optics applications including but not limited to atmospheric turbulence sensing, ocular wavefront sensing, beam profiling, analog light projection using analog MEMS, simultaneous multi-probe atomic force microscopy, readout of an IR cantilevered array, discrete wavefront sampling microscopy, adaptive gradient spatial filtering and tissue wavefront sensing for confocal/two photon microscopy and optical coherence tomography.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a diagram of the discrete wavefront measurement device illustrating the various dimensions of the sensor, lens and VTF in a standard configuration;

FIG. 5 is a plot of the coherent transfer function versus local wavefront tilt angle for the known Shack-Hartmann and Pinhole aperture techniques and an embodiment of the VTF using different numerical aperture;

FIGS. 6a through 6c are diagrams of a discrete wavefront measurement device including an afocal wavefront compressor, afocal wavefront expander and an afocal zoom lens system, respectively FIG. 7 is a diagram of an embodiment of a discrete wavefront measurement device for both X and Y tilt angles;

DETAILED DESCRIPTION OF THE INVENTION

Figure 1:
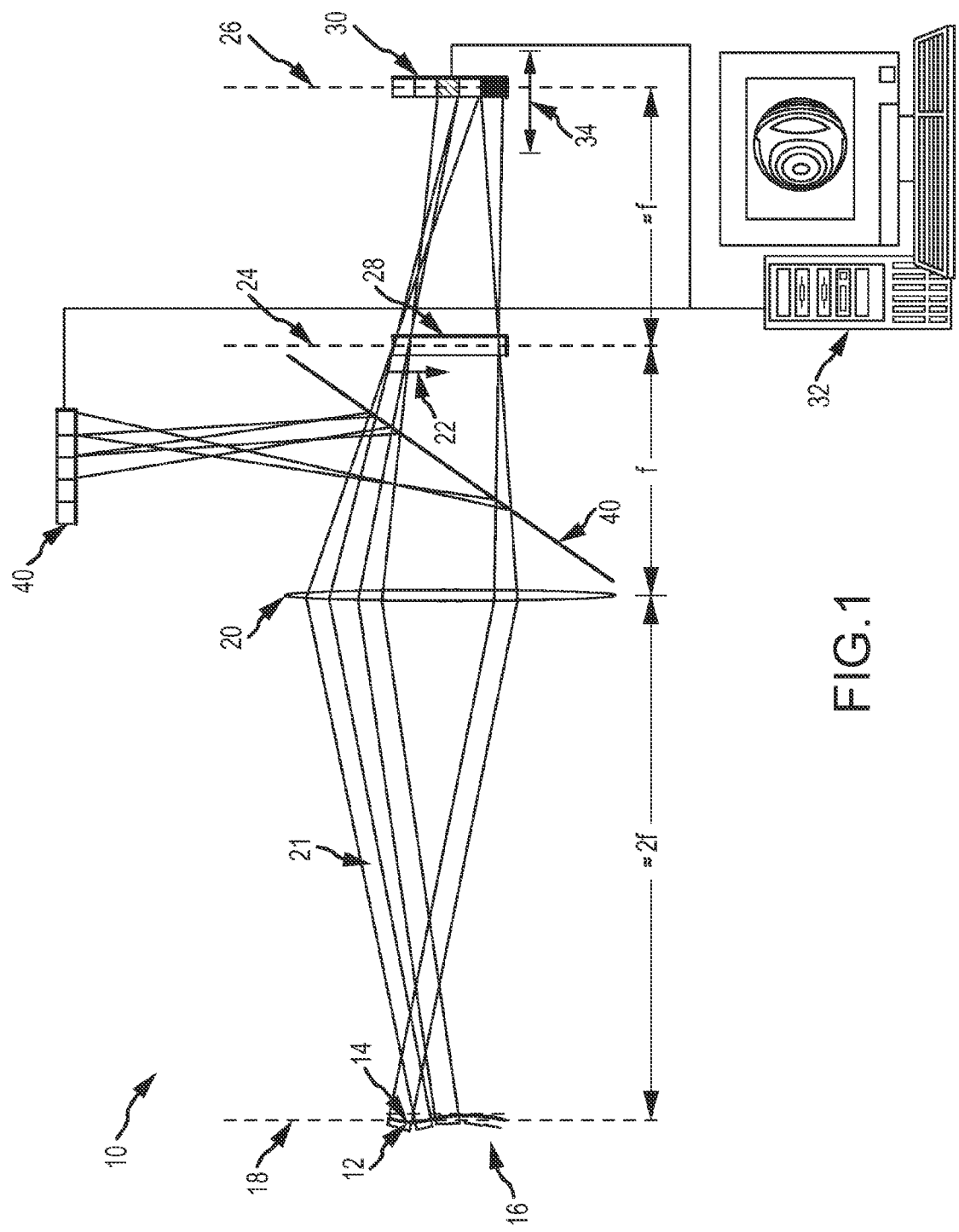
FIG. 1 is a diagram of a discrete wavefront measurement device comprising a variable transmission filter (VTF) in accordance with the present invention.

The present invention provides a cost-effective discrete wavefront measurement device that uses a variable transmission filter (VTF) to decouple the dynamic range of tilt angle measurements in the wavefront from the spatial sampling resolution and the measurement sensitivity as regards the physics of the readout. This approach allows the discrete wavefront measurement device to be configured to a specified dynamic range, transverse sampling resolution and measurement sensitivity at low cost. This approach provides a solution that will serve the adaptive optics and MEMs-based measurement communities immeasurably.

The present invention provides a discrete wavefront measurement device comprising an optical lens system, a variable transmission filter, and at least one radiation detection device. The lens system is used to transform local wavefront tilt angles into a spatial translation in the focal plane in addition to imaging the wavefront onto the radiation detection device. The lens system could be composed of any device that performs the basic function of transforming input ray angles into a spatial translation in the focal plane (e.g. a single lens, a system of lenses and/or mirrors, a diffractive optic, etc.). A variable transmission filter having a well defined transfer function mapped to the effective NA of the lens system is inserted at or near the back focal plane of the lens system to spatially filter the wavefront.

The variable transmission filter allows for efficient mapping of a large dynamic range of tilt angles by modulating the amplitude of the signal in the Fourier plane. When optimized, the variable transmission filter component significantly decouples the maximum tilt angle measurement from the minimum detectable tilt angle measurement. While this is not strictly true since sensitivity of measurement is always a function of the maximum measurable title angle (i.e. the dynamic range of the device), the limitation of dynamic range has been extracted from the physical geometry (e.g. the lenslet pitch size in the case of the Shack-Hartmann Wavefront Sensor and the central spot size in the case of the pinhole aperture) and placed in the available dynamic range of the radiation detection device (e.g. a CCD or CMOS device) and the VTF. The dynamic range is determined by the most restrictive of (a) the relationship between the detector size, focal length of the optical system and position of the conjugate image plane, (b) the NA of the optical system and (c) the active region of the VTF. Typically, the detector size and focal length are used to set the maximum detectable tilt angle, with the NA and VTF active region selected to match this dynamic range. The conjugate image plane location is used to manage the spatial resolution of the measurement. The maximum measurable tilt angle coupled with the bit depth of the radiation detection device and VTF provides the minimum possible measured tilt angle. This minimum possible measured tilt angle can be then be thought of as the sensitivity of the measurement device, assuming the VTF has been designed to provide a linear transfer function with respect to the local wavefront tilt angle. With current radiation detection devices the bit depth is significant (i.e. 8, 12, or 16 bit CCD devices are common), allowing for a large increase in dynamic range while at the same time improving the sensitivity of the measurement. In addition to effectively decoupling of the dynamic range from the sensitivity of measurement, the spatial sampling resolution of the wavefront measurement is completely decoupled from the dynamic range. The spatial resolution of the wavefront measurement is a function of the pixel pitch size in the radiation detector and the magnification present in the optical system. If for example the radiation detection device is placed two focal lengths from the exit pupil of the lens system, unity magnification will result, and the wavefront will be spatially sampled two focal lengths from the entrance pupil at the same pitch as the radiation detection device.

In an embodiment shown in FIG. 1, a discrete wavefront measurement device 10 for discretely sampling local tilt 12 across different sub-regions 14 of a continuous optical wavefront 16 at an object plane 18 comprises an optical system 20 (depicted as a single lens) having a numerical aperture (NA). Optical system 20 maps the local tilt of a collimated ray bundle 21 of each sub-region of the optical wavefront to a spatial displacement 22 at the back focal plane 24 of the system and images the wavefront at a conjugate image plane 26 beyond the back focal plane. A variable transmission filter (VTF) 28 is positioned at or near the back focal plane. The VTF exhibits a variable transmission profile over an active region up to a cut-off angle. The VTF attenuates the wavefront in accordance with the spatial displacements of each sub-region in the VTF's active region. A pixilated detector 30 positioned at the conjugate image plane is responsive to the attenuated wavefront to discretely measure optical intensities across the different sub-regions of the wavefront to characterize the local tilts of the wavefront at the object plane 18. A computer 32 is configured to read out the measured optical intensities. This computer may be a traditional computer or FPGA or CCA for example. In some embodiments, a translation stage 34 may be employed to move the detector back-and-forth to change the field of view and/or dynamic range adaptively. In this embodiment, the object plane 18 is positioned at twice the front focal plane from the optical system, the VTF is positioned at the back focal plane and the detector and conjugate image plane 26 are positioned at twice the back focal plane. In this geometry, the magnification is 1:1 and the wavefront is spatially sampled at the spatial sampling resolution of the detector.

Typically, the detector size and focal length set the maximum detectable tilt angle and the NA and VTF active region are selected to match in the following way:

$$\tan(\theta_{max}) = \frac{D_{DET}\left(\frac{3\Delta z'}{f} - 1\right)}{2(f + \Delta z')}$$

$$D_{lens} \geq \left(\frac{f + \Delta z'}{\Delta z'} + 1\right)D_{DET}$$

$$D_{VTF} \geq D_{DET}\frac{(3\Delta z' - f)}{(\Delta z' + f)}$$

Where $\Delta z'$ is defined as the distance from the back focal plane of the optic to the detector. The detector position defines the conjugate image and object plane and is used to set the spatial resolution of the system, although as can be seen in the equation above it can be used to increase or decrease the dynamic range. When the detector is positioned at $\Delta z' = f$, where the magnification is 1:1, this relationship simplifies to:

$$\tan(\theta_{max}) = \frac{D_{DET}}{2f}$$

$$D_{lens} \geq 3D_{DET}$$

$$D_{VTF} \geq D_{DET}$$

If the input wavefront 16 under measurement is not uniform enough in amplitude (e.g. the non-uniformities are greater than the sensitivity of the measurement device), the amplitude modulations in the input wavefront will erroneously get mapped to a different angle by the detector device 30, since the variation in local wavefront tilt angle is transformed into a variation in amplitude via the variable transmission filter. In this case, a second radiation detection device 40 could be placed in a folded version of the same plane as the first radiation detection device 30. By inserting a beam splitter 42 in front of variable transmission filter 28, but behind the lens system 20, the input wavefront amplitude can be measured and used to normalize the signal measured by the first radiation detector device. While this is one particular method for non-uniformity correction (NUC), it is noted that there are many other methods of performing this task that are readily apparent to anyone skilled in the art. For example the second radiation detection device 40 may constitute a portion of the first radiation detection device 30. Alternately, in an application where the external source is controllable, an unmodulated wavefront may be passed through the discrete wavefront measurement device to generate the NUC terms.

As described, optical system 20 performs two functions in the general wavefront sensing embodiment (and a third function of collimating a source of light in an illumination path, such as in the case of measuring a MEMs based mirror tilt). The optical system first serves as a Fourier transform device mapping the angular spectrum of the incident wavefront 16 spatially to the back focal plane 24 where the variable transmission filter 28 encodes a distinct transmission function onto the angular spectrum. From a geometric optics perspective all rays 21 incident on a lens at a particular angle from a collimated source arrive at the same transverse location (spatial displacement 22) in the back focal plane 24 of a lens regardless of their spatial location prior to the lens. This behavior is described by a very simple equation:

$$y = f \tan(\theta)$$

Where y is the ray height (spatial displacement) in the focal plane, f is the focal length of the lens, and θ is the incident angle of the ray.

Optical system 20 also causes either the measured wavefront or the MEMs mirror array to be imaged. As long as the array or sampled wavefront is at least one focal distance away from the lens, a real image of the device will occur in the conjugate image plane. It is important to note that while the wavefront 16 under test is propagated to the optic, the distance between the lens 20 and the detector 30 will define where wavefront 16 is sampled. This second lens function is described by the first order imaging equation:

$$\frac{1}{z'} = \frac{1}{z} + \frac{1}{f}$$

Where z' is the image distance (defined as positive to the right of the lens), z is the object distance (defined as negative to the left of the lens), and f is the focal length of the lens. All that is required for the second function of the lens to perform properly is the MEMs array or wavefront sampling plane 18 to be conjugate with the detector plane 26, adhering to the simple imaging equation above. While the term "lens" has been used throughout this section, it is understood that the lens in this system could be replaced by a series of lenses and/or mirrors that consist of an optical system with the functions that can be described by the properties of a single lens. In addition to traditional optics any component that provides a similar physical function, such as a diffractive lens is meant to be included as well.

By avoiding the use of either a lenslet array or a limited aperture, such as a pinhole, the system transfer function is dramatically increased. In coherent imaging, the transfer function is defined by the ratio of the focal length of the optic and pupil size, which can generally be referred to as either the f-number and through a simple relationship, the NA of the lens. The spatial frequency at which no light is transmitted is directly proportional to the NA of the optic in this case. It is clear that the use of a large NA or small f-number optic dramatically increases the cut-off angle over the pinhole or Shack-Hartmann techniques since the cut-off frequency is proportional to the diameter of the pupil over the focal length of the lens. In the case of the lenslet array, the dynamic range cannot be improved beyond a certain level because the individual lenslet apertures are used to sample the wavefront in the transverse plane. If the lenslet aperture is too large, the transverse resolution of the wavefront will not be sufficient. In the case of the pinhole, the system transfer function is dramatically truncated in the Fourier plane by the small aperture. Unfortunately this is the only way a binary transmission aperture can modulate the amplitude of the transmitted beam as a function of incident angle. All binary edge optical filters have a fixed bandwidth defined by the size of the point spread function in the focal plane. The nonlinearity in the transfer function slope might change slightly based on the geometrical shape/size of the filter, but the bandpass remains the same. However, with the use of the VTF the NA of the lens can be at least an order of magnitude larger than the effective NA in a Shack Hartmann Wavefront Sensor or pinhole device. In addition, rather than translating a fixed bandpass temporally, as is the case with the binary edge filter approach, the VTF approach allows the bandwidth and shape of the transfer function to be modified.

Figure 2B:
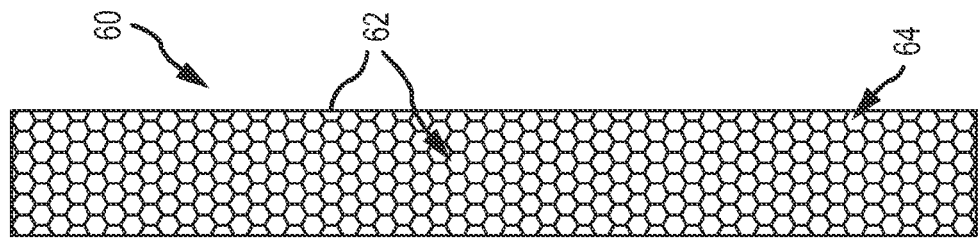
FIGS. 2a and 2b are diagrams of an embodiment of a VTF.
Figure 2A:

The variable transmission filter (VTF) 28 performs as an optical attenuator with a varied transmission profile in the transverse plane. The varied transmission profile then acts as the transfer function for the system, encoding local tilt angle with an amplitude dependence. The VTF is matched in size within the transverse plane to the desired field of view and dynamic range of the wavefront sensing device. In the case of a single axis MEMs mirror tilt, a rectangular shaped filter is sufficient, however, for general wavefront sensing the device should be large enough to cover the desired field of view in both the transverse plane directions. In the 1:1 imaging case, the VTF has the same size as detector 30 to match the field of view and dynamic range. The VTF may be fabricated in a variety of ways. The most common off the shelf variable transmission filter 50 is simply a glass slide 52 with a varying density of chrome 54 deposited on the surface as shown in FIG. 2a. An alternative method for forming a VTF 60 is the placement of small low transmission regions 62 (usually circular) on a glass substrate 64 with varying densities as shown in FIG. 2b and described in U.S. Pat. No. 6,404,970. Whether via partial reflection or absorption, the desired characteristic of the component is a variable transmission profile in the transverse plane.

The variable transmission filter allows the transfer function to be tailored such that tilt angles are encoded with a specific amplitude difference. In addition, the introduction of the variable transmission filter allows the dynamic range of the wavefront sensor to be decoupled from the spatial resolution of the wavefront, something the Shack-Hartmann Wavefront Sensor is incapable of. While the slope of the variable transmission filter transfer function at first glance looks like it could lead to a decrease in the sensitivity of the wavefront measurement, the dynamic range of a standard CCD detector coupled with the resolution in a standard VTF, provides the capability for increased sensitivity over the prior art as well.

In an optimized system, the size of active region of the VTF is selected to match the cut-off angle. This angle is related to a maximum height in the focal plane (y=f*tan(theta_max), defining the required active region (i.e. region with varying transmission profile) in the VTF for it to match the system performance. If the VTF has a smaller size, the dynamic range will be smaller than what is possible with the optic and detector combination. To optimize the system the VTF size is matched to the height of the max tilt ray in the focal plane.

The system transfer function may be optimized for different purposes. Typically, the transfer function would have a linear mapping between the local wavefront tilt angle and optical attenuation, such that the detector can utilize its full dynamic range. However, while measuring a MEMs based mirror tilt, it might be advantageous to create a variable transmission filter profile that linearly maps the physical process measured by the MEMs device (e.g. incident IR photons for a cantilevered array), taking into account any nonlinearities in the MEMs pixel response due to the physical phenomena being measured. Alternatively certain regions within the range of measured tilt angles could be of greater interest. To address this desire, the VTF could be designed with more resolution in the regions of interest, optimizing the use of the detector dynamic range.

The design of a particular discrete wavefront measurement device is dictated by a number of factors and trade-offs including the specification on spatial sampling resolution, dynamic range and measurement sensitivity, the spatial extent of the waveform to be sampled, whether tilt measurement is one or two dimensional, packaging considerations (e.g. size and overall length), prescription, use of off-the-shelf components, and cost of individual components and the entire system. There are various design approaches to selection and placement of the optical lens system, VTF and detector.

Figure 3:
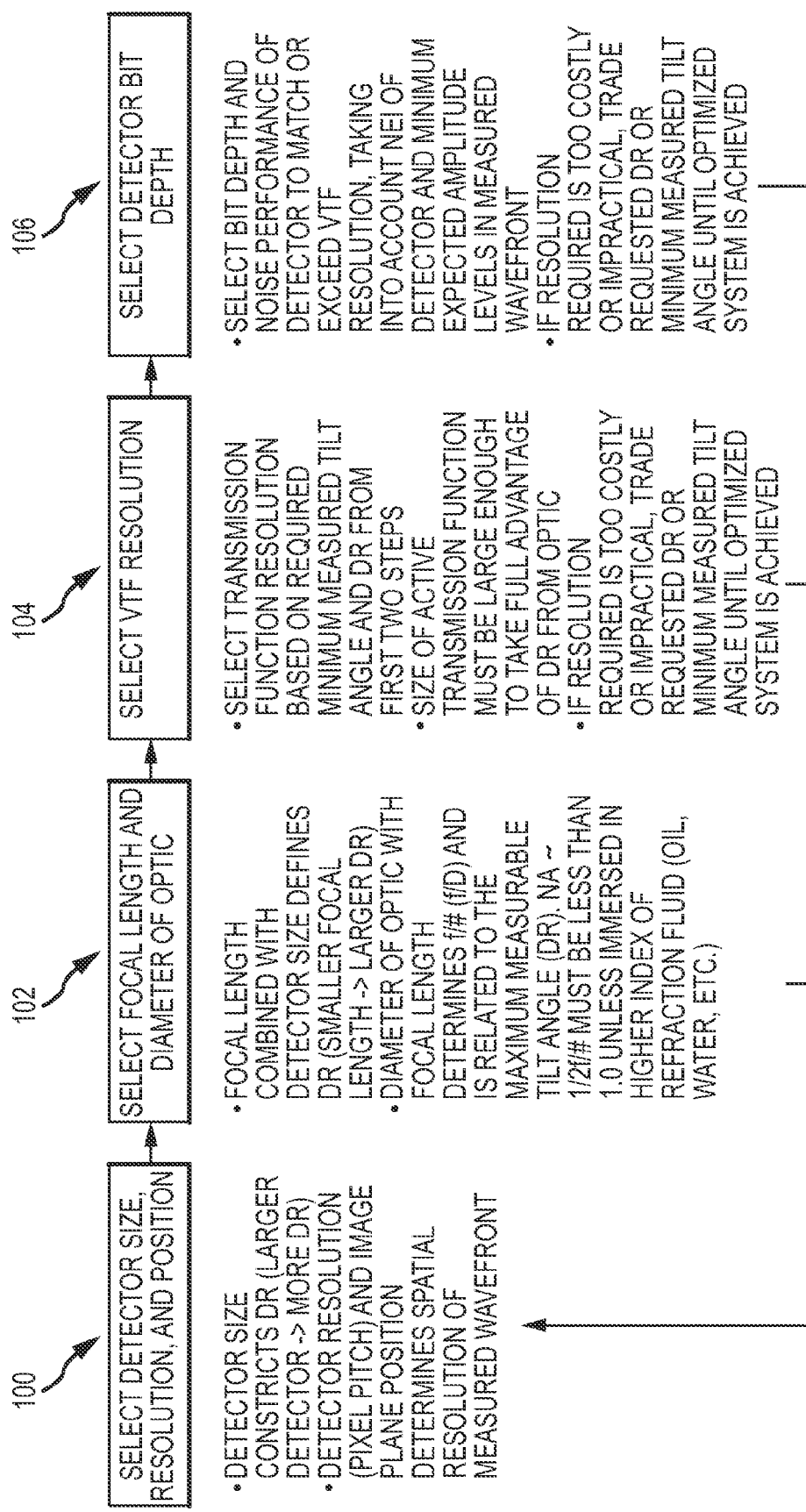
FIG. 3 is a flow diagram for the design of a discrete wavefront measurement device with a VTF.

In an embodiment shown in FIG. 3, the first step in the design process is to select the detector size and resolution and its position relative to the optical system (step 100). To do this, the desired spatial sampling and extent of the wavefront under test are first specified. After these parameters are selected, the detector pixel size, number of pixels, and the position of the detector (normalized by the focal length of the optic) are determined. The detector position relative to the optic determines the magnification of the sampled wavefront. The detector position is nominally twice the focal length from the optic at which magnification is 1:1. However, the detector may be positioned closer to or more likely further away from the optic. Taking this into account the pixel size (also known as pitch) is selected to obtain the requested spatial sampling resolution. The field of view (FOV) of the detector is selected to match the desired extent of the wavefront under test, again taking the magnification into account. The number of pixels coupled with the pixel pitch determines the size of the detector and thus sets the achievable FOV and dynamic range. The detector size is directly related to the maximum measurable tilt angle, so in general this component will be made as large as possible, until the point that budget constraints make it difficult to meet additional requirements on measurement sensitivity. If the detector size, pixel pitch, or working distance required to meet the wavefront measurement requirements is impractical, an iterative process takes place where requirements on the spatial resolution, dynamic range, or size of the sampled wavefront are relaxed until the offending parameter(s) are within cost/time budget constraints.

The next step is to determine the prescription (focal length and diameter) of the optic (step 102). The diameter of the optic is a multiple of the detector size to successfully collect all the rays from the maximum measurable local tilt angle at the edge of the FOV. In general the lens diameter Dlens is related to the detector diameter Ddet as:

$$D_{lens} \geq \left(\frac{f + \Delta z'}{\Delta z'} + 1\right) D_{DET}$$

where f is the focal length and $\Delta z'$ is the distance from the back focal plane to the detector. If the detector is positioned at $\Delta z'=f$, Dlens=3*Ddet. If the detector is moved further from the lens ($\Delta z'>f$) to increase spatial sampling resolution then the required lens diameter is smaller and if the detector is moved closer to the lens ($\Delta z'<f$) to increase the spatial extent of the sampled wavefront the required lens diameter is larger to maintain the same dynamic range. The former may also be achieved by using an additional optic to compress the wavefront without having to increase the diameter of the lens and sacrifice spatial sampling resolution.

In addition, the maximum measurable local tilt angle is defined in the following way:

$$\tan(\theta_{max}) = \frac{D_{DET}\left(\frac{3\Delta z'}{f} - 1\right)}{2(f + \Delta z')}.$$

The focal length of the optic is decreased until either the required maximum measured local tilt angle is met or the prescription of the optic begins to impact budget constraints (i.e. f/#=f/Dlens, f/#=2 is cheaper than f/#=1, etc.). If the latter occurs, the detector size and optic prescription can be optimized for cost considerations, or a relaxation of the maximum measured local tilt angle required may be necessary. If the detector size is larger than necessary to meet the maximum measurable local tilt angle requirement, the diameter of the optic can be reduced, allowing a higher f/# optic for reduced cost/complexity until the system fails to meet this requirement.

Next a variable transmission filter (VTF) is selected (step 104). Given that the dynamic range of the system is defined by the most restrictive of (a) the relationship between the detector size, focal length of the optical system and position of the conjugate image plane, (b) the NA of the optical system and (c) the active region of the VTF, the VTF filter resolution must be selected to match the minimum measurable local tilt angle requirement. The required filter diameter must be twice the focal length multiplied by the tangent of the desired maximum measured tilt angle. The filter size divided by the transmission resolution in the filter defines the bit depth of the filter. This bit depth can be varied until the desired measurement sensitivity is achieved. If the required bit depth within the filter spatial extent is impractical due to cost/technology constraints, an iterative process takes place where the maximum measurable local tilt angle, minimum measurable local tilt angle, and focal length of the optic are varied to optimize the solution for cost and performance. If the maximum and minimum angle measurement requirements must be met and the bit depth required in the VTF is still impractical, the detector can be manufactured with more pixels, or alternatively spatial sampling can be sacrificed (larger pixel pitch) to achieve a larger active detector area. The larger detector can then be used to provide more spatial extent within the VTF to fill the desired bit depth. In addition the detector can be translated further from the optic for the same effect.

Finally, the detector bit depth and noise performance must be selected (step 106). Bit depth is selected so that the detector will match or exceed the VTF resolution, taking into account the lowest possible amplitude level expected during the wavefront measurement. This requires that both the NEI (Noise Equivalent Irradiance, Signal Irradiance at which SNR=1) and bit depth of the detector are sufficient to meet the VTF resolution. If the required NEI and bit depth are impractical due to cost/technology constraints for the expected wavefront under measurement, the required minimum measurable local tilt angle and/or maximum measurable local tilt angle requirement must be relaxed and the system should be re-optimized for cost.

The entire design process may be iterated until a satisfactory design is found that meets all performance, packaging and cost requirements.

An embodiment for an optimized design in which the detector 30 is positioned at twice the focal length from the optic 20 is illustrated in FIG. 4. The object plane 18 in which the wavefront is sampled is at twice the focal length on the front side of optic 20. The diameter of optic 20 is three times the detector diameter to capture ray bundles 21 for plus and minus max local tilt. The magnification is 1:1. The 1:1 mapping means that the spatial extent of the wavefront is discretely sampled with the sample size equal to the pixel pitch. While exact positioning of the object and image planes is not required, the fidelity of the measurements will degrade when either component strays from their defined conjugate position.

At other planes, the lens has a magnification different than unity (m=image distance/object distance) and the wavefront can be sampled in the transverse plane with increased resolution. This of course leads to a reduction in the spatial extent of the imaged wavefront, so this process results in a trade of sample resolution vs. sample size.

To illustrate the stark disparity in dynamic range performance, plots of the coherent transfer function (CTF) versus local wavefront tilt angle are provided for a Pinhole Aperture 150, standard Shack-Hartmann wavefront sensor 152, and for the VTF device with two different NA, 0.5 154 and 0.95 156 in FIG. 5. For purposes of comparison, each technology is configured to provide the same measurement sensitivity. The Pinhole Aperture and VTF also exhibit the same spatial sampling resolution, the Shack-Hartmann exhibit a more coarse sampling resolution on account of the lenslet array.

For a typical optical system, the Coherent Transfer Function is simply a function of the input pupil (in the case of circularly symmetric systems shown in one dimension, a tophat function) with the arguments scaled by the NA of the lens and the wavelength of illumination. The NA is related to the maximum tilt angle that can be transmitted by the system by the sine function. Typically this is just a function of the system f/# (NA=n*sin(½*f/#)=n*sin(theta_max), where n is the index of refraction in the image, usually set to air, n=1). In the case of a standard circular lens, the coherent transfer function is a tophat function that drops instantaneously to zero at the cut-off angle.

In the case of the pinhole in the focal plane, the pinhole clips the larger lens transfer function dramatically, based on the angular extent of the pinhole size and optical point spread function (psf). While the real transfer function in this system should have some shape to it depending on the aperture size/shape and psf from the lens (i.e. it won't look like a perfect tophat) the function shown in 150 is meant simply to display the achievable dynamic range. The dynamic range is essentially the arc tangent of the psf diameter over the focal length of the lens (typically 1 deg).

In the case of the standard off the shelf, Shack-Hartmann, lenslet sizes are ~150 um with f=5 mm optics. This is equivalent to a cut-off angle of approximately 0.86 deg.

Using the VTF, the CTF is a bit more complicated. Because the wavefront is imaged at a distance Δz' from the back focal plane, the maximum measurable tilt angle is equal to:

$$\tan(\theta_{max}) = \frac{D_{DET}\left(\frac{3\Delta z'}{f} - 1\right)}{2(f + \Delta z')}$$

As described previously to measure this angle across the entire field of view, the diameter of the lens must be some multiplier larger than the detector diameter (e.g. 3× if Δz'=f). Taking this into account, for a standard NA=0.5 objective, the maximum tilt angle is ~4.75 deg. If instead, a NA=0.95 objective is used, the maximum tilt angle is ~17.5 deg. An oil or water immersion objective may be used to increase this angle based on the magnitude of the change in index of refraction or the detector might be translated further from the exit pupil of the optic.

In an embodiment of the discrete wavefront measurement, the spatial sampling resolution is 100 um or smaller, the dynamic range is at least 2.0 degrees and the tilt measurement sensitivity is 100 urad smaller.

In another embodiment of the discrete wavefront measurement, the spatial sampling resolution is 5 um or smaller, the dynamic range is at least 5.0 degrees and the tilt measurement sensitivity 20 urad or smaller.

If a larger dynamic range is desired and the f/# number of the lens 20 must remain the same for cost or technical constraints, the detector 30 can be placed at a distance greater than 2f from the lens 20 as shown in FIG. 6a. As the detector is placed further from the lens, the required diameter of the lens decreases, approaching the detector size at an image distance of infinity. While there are practical constraints on the image distance, moving the detector just one more focal length from the lens requires that the lens be 2× the detector diameter instead of 3× at the nominal 2f image plane. With a fixed f/#, the smaller required lens diameter can be used to decrease the focal length of the optic. This decrease results in an increase in the maximum measurable tilt and thus the dynamic range of the system. However, because the image plane is further from the lens, the optical magnification increases, which means the sampled wavefront in the object plane actually decreases in size.

To retain the same spatial resolution as with the nominal 2f image plane, an afocal beam compressor 200 comprising a first lens 202 having focal length f1 and a second lens 204 having focal length f2 can be positioned in front of optic 20 to compress wavefront 16. The magnification of the two-lens system (m=f2/f1) is matched to the inverse of the magnification for the readout optic. This coupling system allows the wavefront to be sampled over the same spatial extent while also retaining the sampling resolution. This method for increased dynamic range can be used up to the practical packaging limit for the detector and afocal coupling system.

Figure 6B:
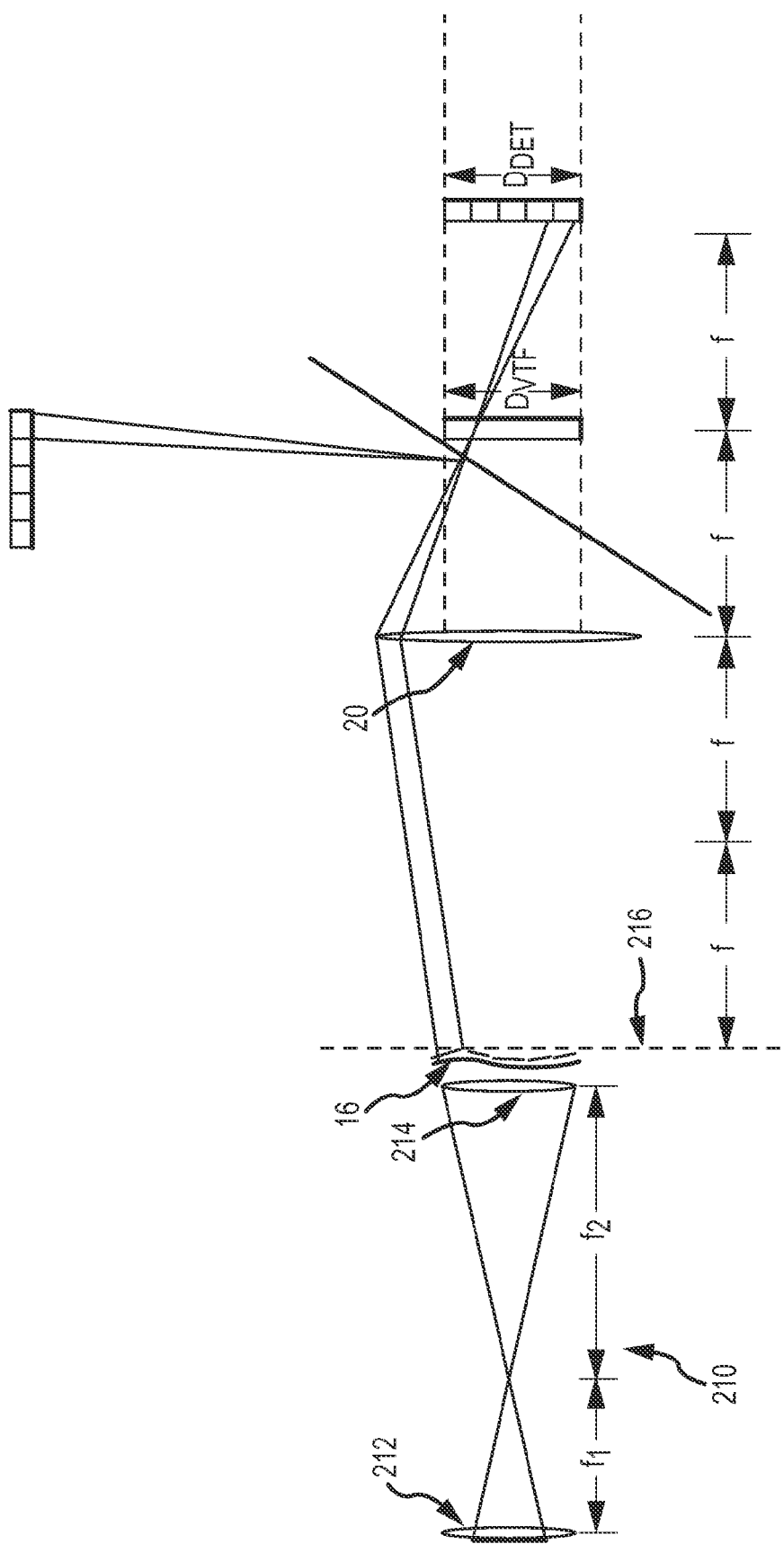

As shown in FIG. 6b, to measure a wavefront in which the magnification of the optical system and input wavefront spatial extent do not fill the entire detector, an afocal beam expander 210 comprising a first lens 212 having focal length f1 and a second lens 214 having focal length f2 can be positioned in front of optic 20 to expand the wavefront 16. The magnification of the two-lens system (m=f2/f1) is matched to the inverse of the magnification for the readout optic. This coupling system allows the wavefront to be sampled at wavefront sampling plane 216 with increased sampling resolution due to the use of the entire detector. This method can be used up to the practical packaging limit for the afocal coupling system.

Figure 6C:
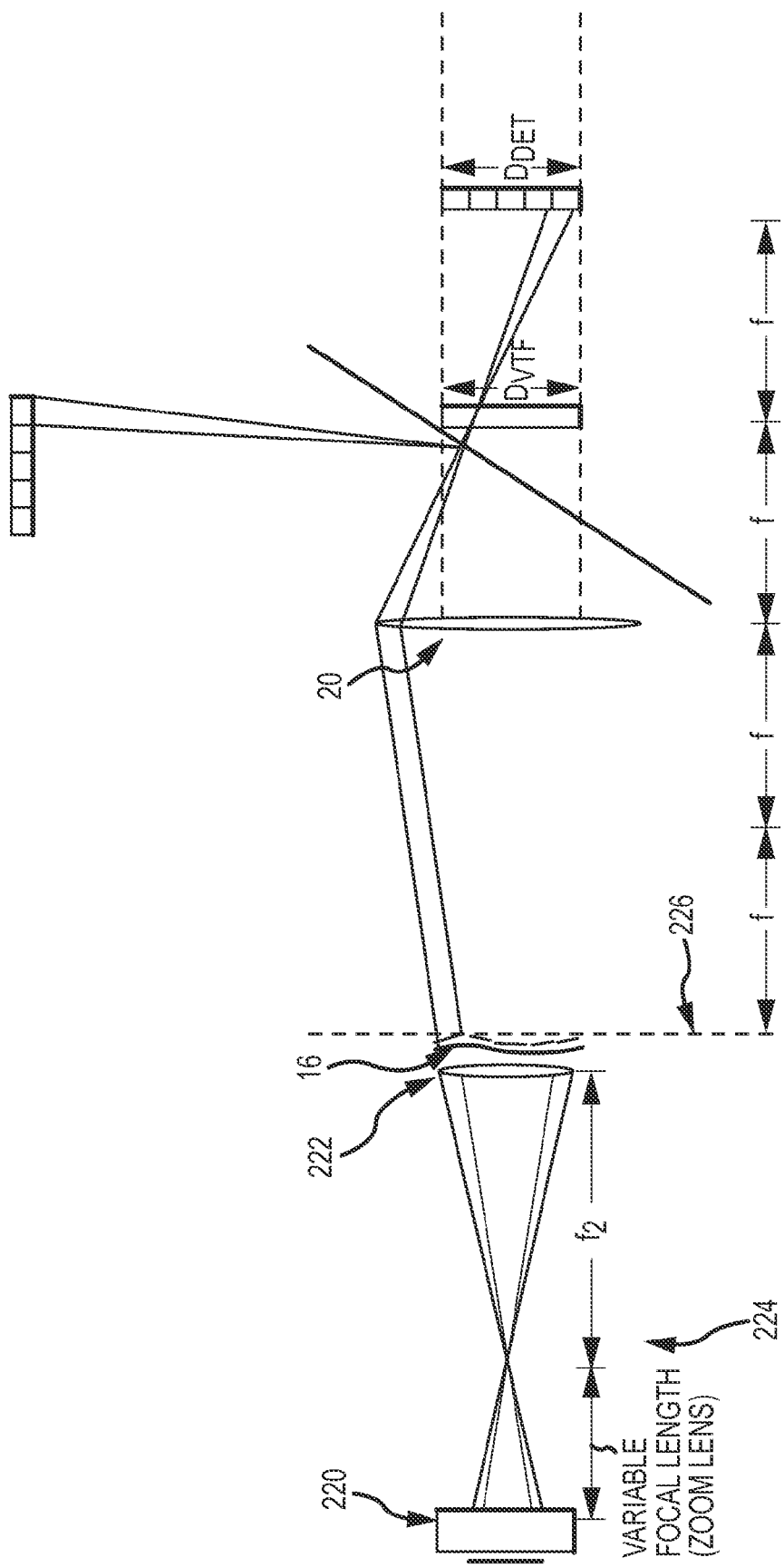

As shown in FIG. 6c, to measure a series of wavefronts with varying spatial extents, a zoom lens 220 comprising at least two lenses that are moved with respect to each other to provide a change in focal length f1, while retaining the same image location. An additional lens 222 having focal length f2 is fixed and positioned to provide an afocal system. The magnification of the zoom afocal system 224 (m=f2/f1) is matched to the inverse of the magnification for the readout optic. This coupling system allows the wavefront 16 to be sampled at a wavefront sampling plane 226 in a variety of different ways, giving it flexibility in a commercial environment. This method can be used up to the practical packaging limit for the afocal coupling system.

In order to measure the wavefront in both X and Y dimensions in the transverse plane, the core measurement device can be modified in at least two distinct ways. The first and most straightforward is to simply add bit depth to the VTF used in the one-dimensional embodiment. In this case there are no additional components necessary, but the required measurement resolution for tilt angle detection in each dimension will be multiplied together and the VTF/detector combination will need to reflect this with an increase in bit depth. If the required bit depth is too large for cost and/or manufacturing constraints, a different approach could be pursued that effectively splits the two dimensions into separate optical paths as shown in FIG. 7. If the measured radiation is monochromatic, a diffraction grating 250 optically downstream from the lens 20 can be used to split the beam into at least three paths, one for amplitude nonuniformity correction (if needed), and an additional path for each dimension to be measured. The VTF in the different paths would then contain the same amount of bit depth required for the one-dimensional measurement as long as a separate detector 252 or region of the detector is used to measure the orthogonal components. If the measured radiation is not monochromatic, a beam splitter arrangement could replace the diffraction grating. It is expected that those knowledgeable in the art could find any number of ways to split the incoming radiation into separate paths for measurement without difficulty (e.g. two wavelength spectral separation, polarization, etc.).

The discrete wavefront measurement device 10 and one or more of the NUC, control feedback and analog image projection may be combined to service various MEMS-based or adaptive optics applications including but not limited to atmospheric turbulence sensing, ocular wavefront sensing, beam profiling, analog light projection using analog MEMS, simultaneous multi-probe atomic force microscopy, discrete wavefront sampling microscopy, adaptive gradient spatial filtering and tissue wavefront sensing for confocal/two photon microscopy and optical coherence tomography. The core discrete wavefront measurement device may be used, for example, to readout the IR radiation sensed by an IR cantilevered array.

Atmospheric Turbulence Sensor for Adaptive Optical Systems

Figure 8:
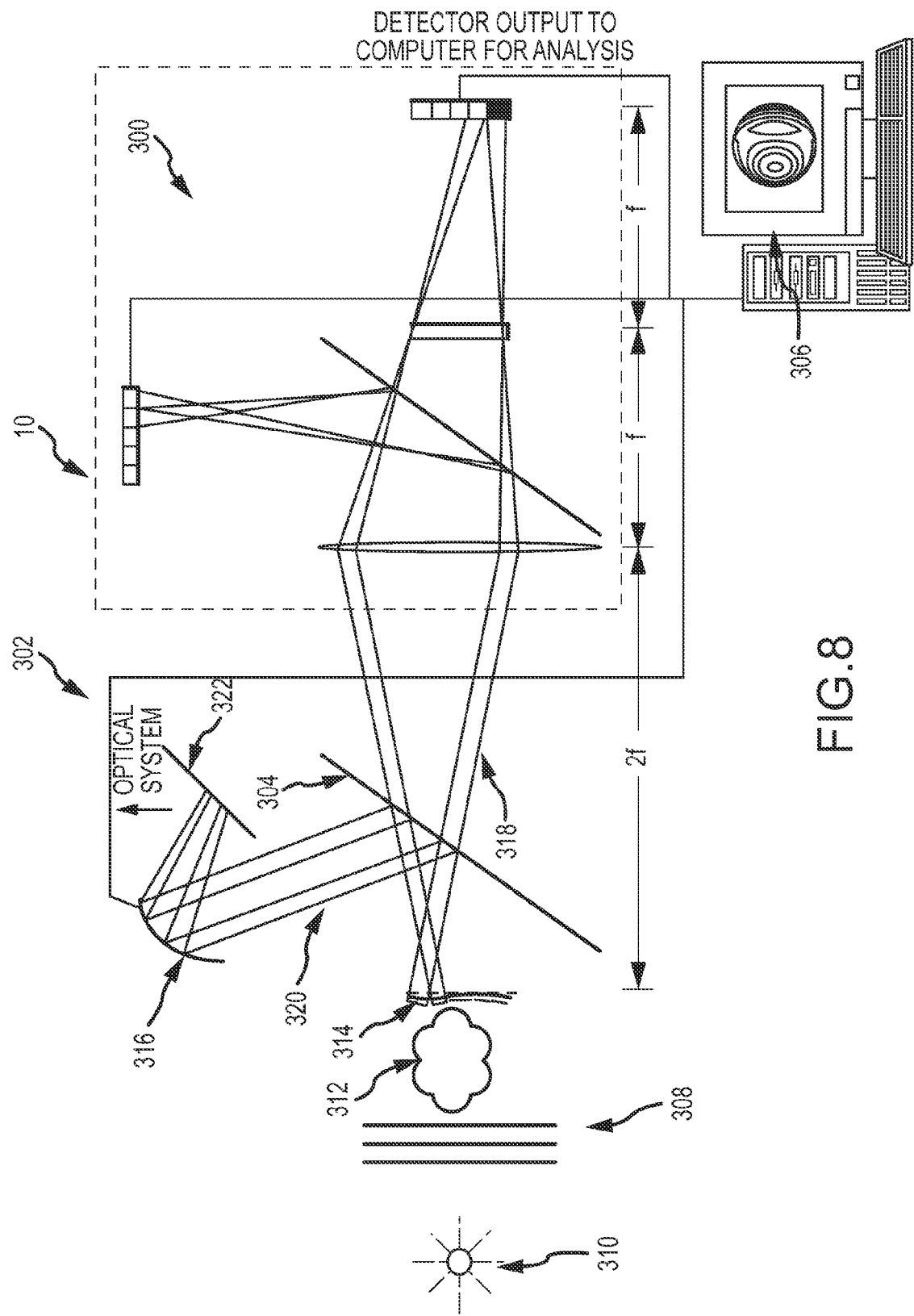
FIG. 8 is a diagram of an atmospheric turbulence sensor incorporating the VTF discrete wavefront measurement device.

As illustrated in FIG. 8, an atmospheric turbulence sensor 300 for an adaptive optical system 302 comprises a beam-splitter 304, the discrete wavefront sampling device 10 and a computer 306. An optical wavefront 308 emanates from a distant object 310 such as an astronomical body and is modified by atmospheric turbulence 312 to produce an aberrated wavefront 314. The sensor is configured to measure the aberrations and provide a feedback signal to an adaptive optical element 316 such as a deformable mirror to remove or mitigate the atmospheric aberrations.

Beam-splitter 304 splits the aberrated wavefront 314 into a first wavefront portion 318 that is directed through the optical system 20 and VTF 28 to the detector 30 and a second wavefront portion 320. Computer 306 discretely reads outs optical intensities across the different sub-regions of the wavefront from the detector, compares the measurements to an ideal response for the distant object and computes feedback signals to correct for the atmospheric induced aberrations. Adaptive optical element 316 is responsive to the feedback signals to compensate the second wavefront portion 320 that is directed off a folding mirror 322 to another optical system that processed the corrected wavefront.

Conventionally a Shack-Hartmann device has been used to perform this function. The discrete waveform sampling device provides an increase in the dynamic range of aberrations that can be measured, in addition to increased sensitivity and spatial resolution, resulting in a much higher fidelity measurement of atmospheric induced aberrations. This is accomplished with components of much lower cost than a Shack-Hartman device.

Ocular Wavefront Sensor

Figure 9:
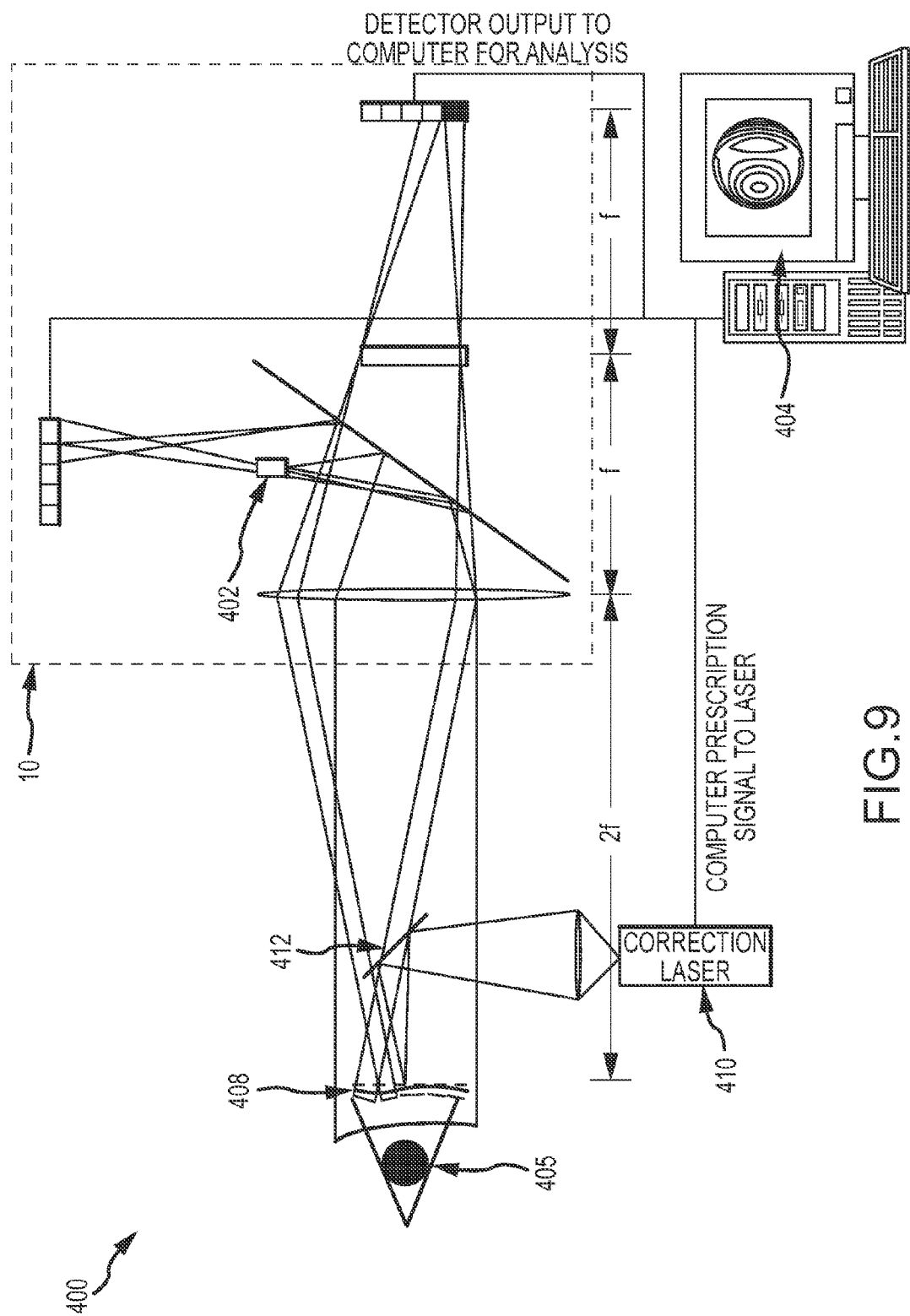
FIG. 9 is a diagram of an ocular wavefront sensor incorporating the VTF discrete wavefront measurement device.

As illustrated in FIG. 9, an ocular wavefront sensor 400 comprises a laser 402, the discrete wavefront sampling device 10, a computer 404 to measure the aberrations present in the eye 405 and provide a corrective signal and means responsive to the corrective signal to perform the corrections. Laser 402 directs a laser beam into a human eye that is reflected as the continuous optical wavefront 408 including ocular aberrations. Computer 404 discretely reads out optical intensities across the different sub-regions of the wavefront, compares the measurements to a response for the human eye to measure the ocular aberrations and computes feedback signals to correct for the ocular aberrations at the spatial sampling resolution of the detector. The correction could be performed via a correction laser 410 and beam splitter 412 in the cornea, insertion of a corrective lens within the eye, or determining a particular prescription for exterior corrective lens systems. In addition the measured wavefront can be used to diagnose disease. A Shack-Hartmann Wavefront Sensor device has typically been used to perform this function. The VTF provides an increase in the dynamic range of aberrations that can be measured, in addition to increased sensitivity and spatial resolution. The increased spatial resolution of the wavefront measurement is a key differentiator, allowing for more densely sampled ocular corrections to be made. This is accomplished with components of much lower cost.

Laser Beam Profiler

Figure 10:
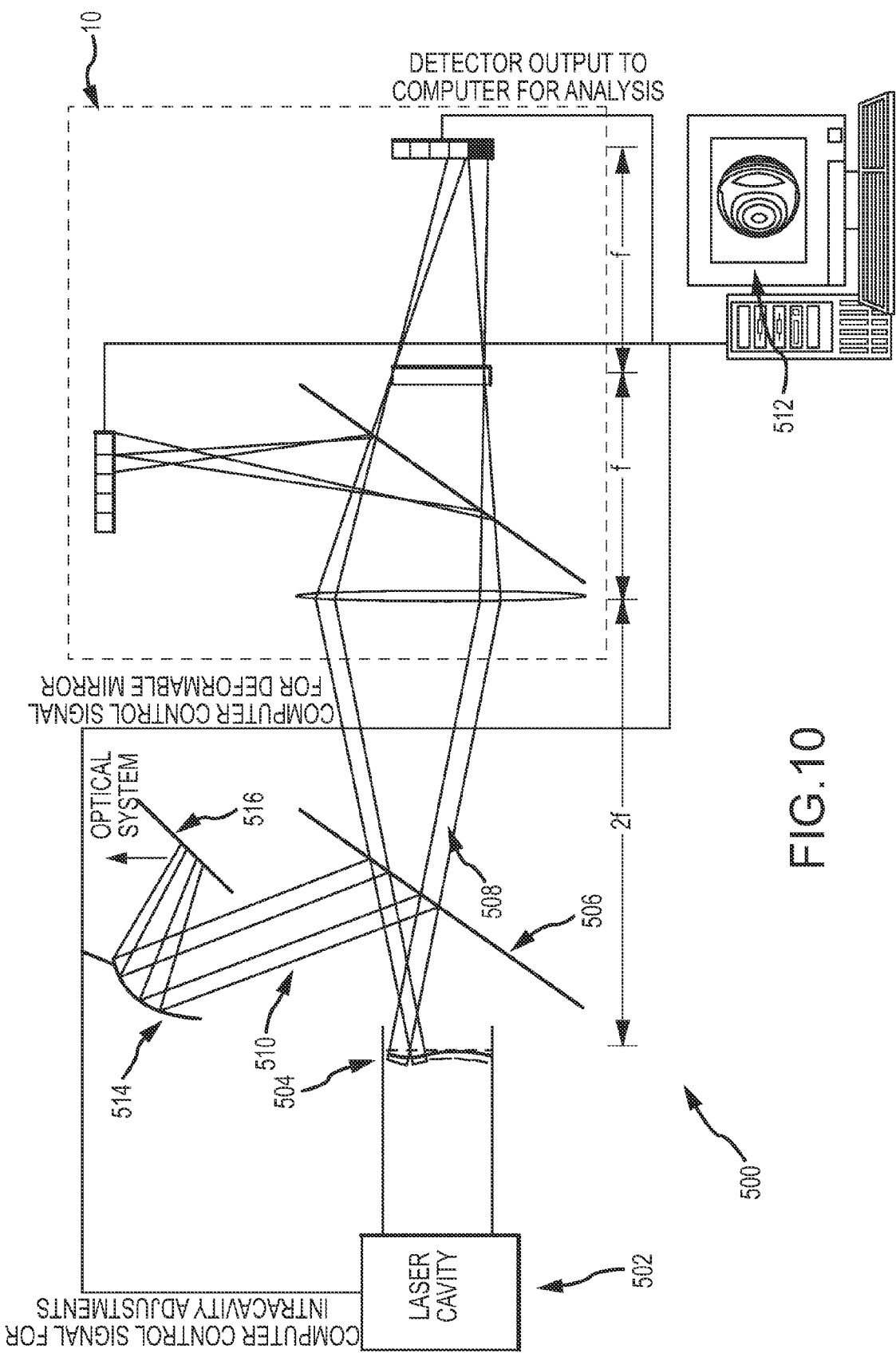
FIG. 10 is a diagram of a laser beam profile incorporating the VTF discrete wavefront measurement device.

As illustrated in FIG. 10, a laser beam profiler 500 comprises a laser cavity 502 emits a laser beam having an aberrated optical wavefront 504, a beam-splitter 506 into a first wavefront portion 508 that is directed through the optical system and VTF to the detector 10 and a second wavefront portion 510. A computer 512 discretely reads out optical intensities across the different sub-regions of the wavefront, compares the measurements to a desired laser beam profile and computes feedback signals (amplitude and phase) to compensate for differences between the desired and measured beam profiles. The feedback signals may be applied to adjust components within laser cavity 502 or to control an adaptive optical element 514 such as a deformable mirror to compensate the second wavefront portion 510. The corrected wavefront may be reflected off a folding mirror 516 to another optical system that processes the laser beam.

A Shack-Hartmann Wavefront Sensor device has recently been used to perform this function. The VTF provides an increase in the dynamic range of aberrations that can be measured, in addition to increased sensitivity and spatial resolution. The increased dynamic range of measurement is a key differentiator, allowing the beam to be sampled much further from the waist, reducing the impact of high energy laser damage. This is accomplished with components of much lower cost.

Optical Readout for IR Cantilevered Array

Figure 11:
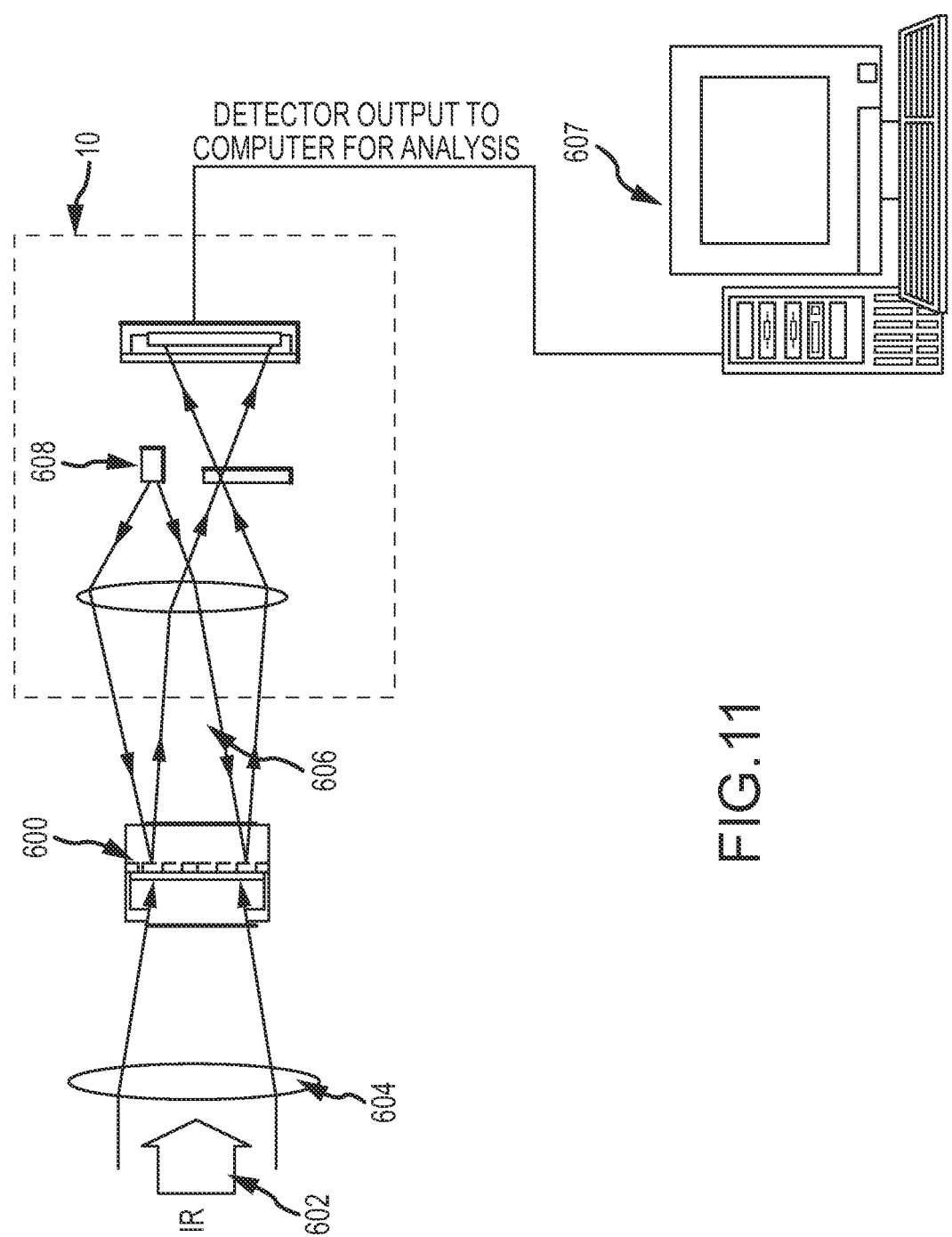
FIG. 11 is a diagram of an IR cantilevered array incorporating the VTF discrete wavefront measurement device.

As illustrated in FIG. 11, a discrete wavefront sampling device is configured to measure the micro mirror tilt angles from an IR Cantilevered Array 600, which uses the absorption of infrared photons 602 through an IR lens 604 and the resultant heat generation to deflect individual micro-mirrors 606 constructed of materials with large mismatches in coefficient of thermal expansion. This bimaterial CTE mismatch results in a pixel tilt related to the incoming radiation. Discrete wavefront measurement device 10 samples each pixel of the IR Cantilevered Array in the conjugate image plane of the wavefront sensing radiation detection device and outputs the measurements to a computer 607. In this embodiment the discrete nature of the "wavefront" is defined by the IR cantilevered array pixels up until the point at which the sample size of the device 10 is larger than the IR cantilevered array pixels. An optical source 608 (e.g. LED, Laser Diode, Laser, etc.) must be inserted to illuminate the reflective back of the tilted pixel array. The illumination could be accomplished using the same lens system 20 already in place for imaging and spatial filtering purposes, or another system could be used to collimate the source. It is understood that anyone skilled in the art could modify the illumination scheme without difficulty. In addition, the variable transmission filter 28 might be optimized differently, allowing for a linear mapping of the physical phenomenon under measurement to amplitude level on the wavefront sensing radiation detection device. Because the response of a cantilevered pixel to the incident IR energy is in general a nonlinear behavior, the variable transmission filter can be designed to take this into account, maximizing the dynamic range of the device and minimizing post-processing of the measured IR scene. In this embodiment, the second wavefront sensing radiation detection device used for amplitude normalization in the other embodiments is not necessary regardless of any non-uniformities present in the illumination scheme and reflective properties of individual pixels. Instead, the device can be calibrated without measurable IR energy incident on the array allowing any non-uniformities to be corrected. It should be noted that any physical phenomena that imparts a tilt on a micro-mirror array could be measured with the discrete wavefront measurement device.

Conventionally a moving pinhole or knife edge has been used to perform the amplitude modulation function. This approach has severe limitations either in time multiplexing the signal (moving the pinhole/knife edge) or in dynamic range (see FIG. 5). The VTF provides a significant increase in the dynamic range of micro-mirror tilt angles that can be measured, in addition to the ability to design the transfer function on a case by case business. The increased dynamic range of measurement is a key differentiator, allowing for a much larger dynamic range of the physical phenomena under measurement.

Analog Light Projection

Figure 12:
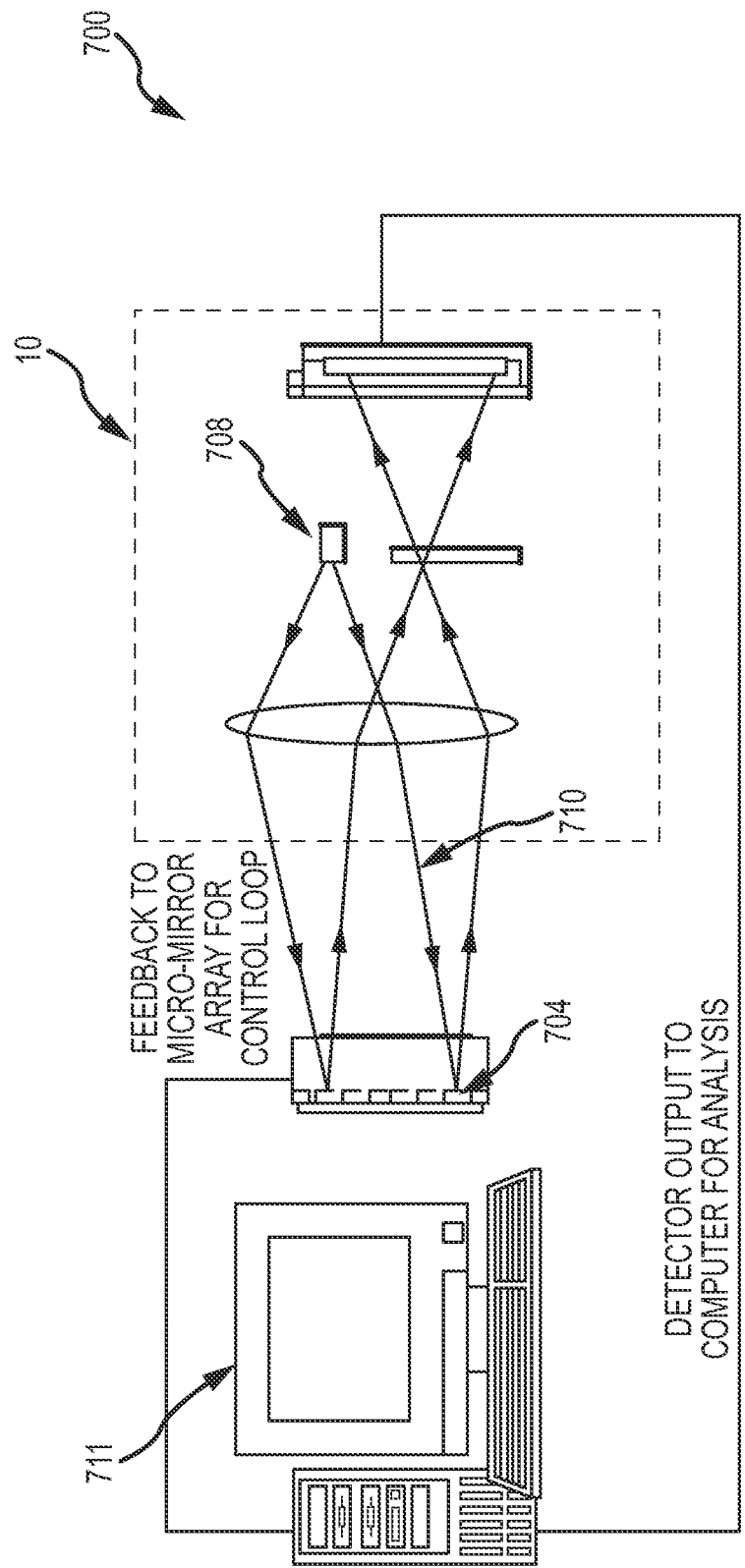
FIG. 12 is a diagram of an analog light projector incorporating the VTF discrete wavefront measurement device.

In an analog light projection system 700, the discrete wavefront sampling device 10 may be used to measure the micro mirror tilt angles from an analog micro-mirror array 704 to provide control feedback to drive the array (FIG. 12). The "analog" nature of the projection is meant to reference a system with greater than two micro mirror tilt states as opposed to the current digital micro-mirror devices, most notably the DLP® technology, which uses a binary on/off micro mirror tilt state for image projection.

The core light projection system comprises an optical source 708 (e.g. LED, lamp, etc.) that illuminates the reflective back of the mirror array 704. The illumination could be accomplished using the same lens system 20 already in place for imaging and spatial filtering purposes, or another system could be used to collimate the source. It is understood that anyone skilled in the art could modify the illumination scheme without difficulty. Drive electronics direct the micromirror array 704 to impart a spatial modulation to the light that creates the wavefront 710. This modulation is ordinarily converted to a gray scale modulation by aperture vignetting and projected as an analog image for display (i.e. the incoherent transfer function provides an amplitude dependence on local tilt angle).

A major limitation to the commercial implementation of Analog MEMS projection systems has been the inability accurately measure and control the deflection of individual micro-mirrors. Open-loop operation simply does not provide the requisite precision. An electric field based control loop has been attempted. Unfortunately this method provided very little control ability because the tilt angle was related to the electric field measurement nonlinearly for larger tilt angles. This lack of control was a major driver to the development of the digital micro-mirror implemented in the DLP® technology. Digital technology does not have the tilt control issues but must exhibit a much higher bandwidth.

With the addition of a computer 711 to the discrete wavefront sensing device 10, a control loop is implemented to provide precision control of the analog micro-mirror tilt angles as shown in FIG. 12. In this embodiment the discrete wavefront measurement device samples each mirror in the analog micro-mirror array in the conjugate object plane defined by the position of the wavefront sensing radiation detection device and focal length of the optic. The discrete "wavefront" is thus defined by the discrete nature of the micro-mirror array. The VTF provides the dynamic range necessary to service analog MEMS-based light projection that is well beyond the capabilities of either the pinhole aperture or Shack-Hartmann devices. In this embodiment, the projection path is separate.

In this embodiment, the second wavefront sensing radiation detection device used for amplitude normalization in the other embodiments is not necessary regardless of any non-uniformities present in the illumination scheme and reflective properties of individual mirrors. Instead, the device can be calibrated without an input signal to the analog micro-mirror array (no spatial modulation) allowing any non-uniformities to be corrected.

Simultaneous Multi-Probe Atomic Force Microscopy

Figure 13:
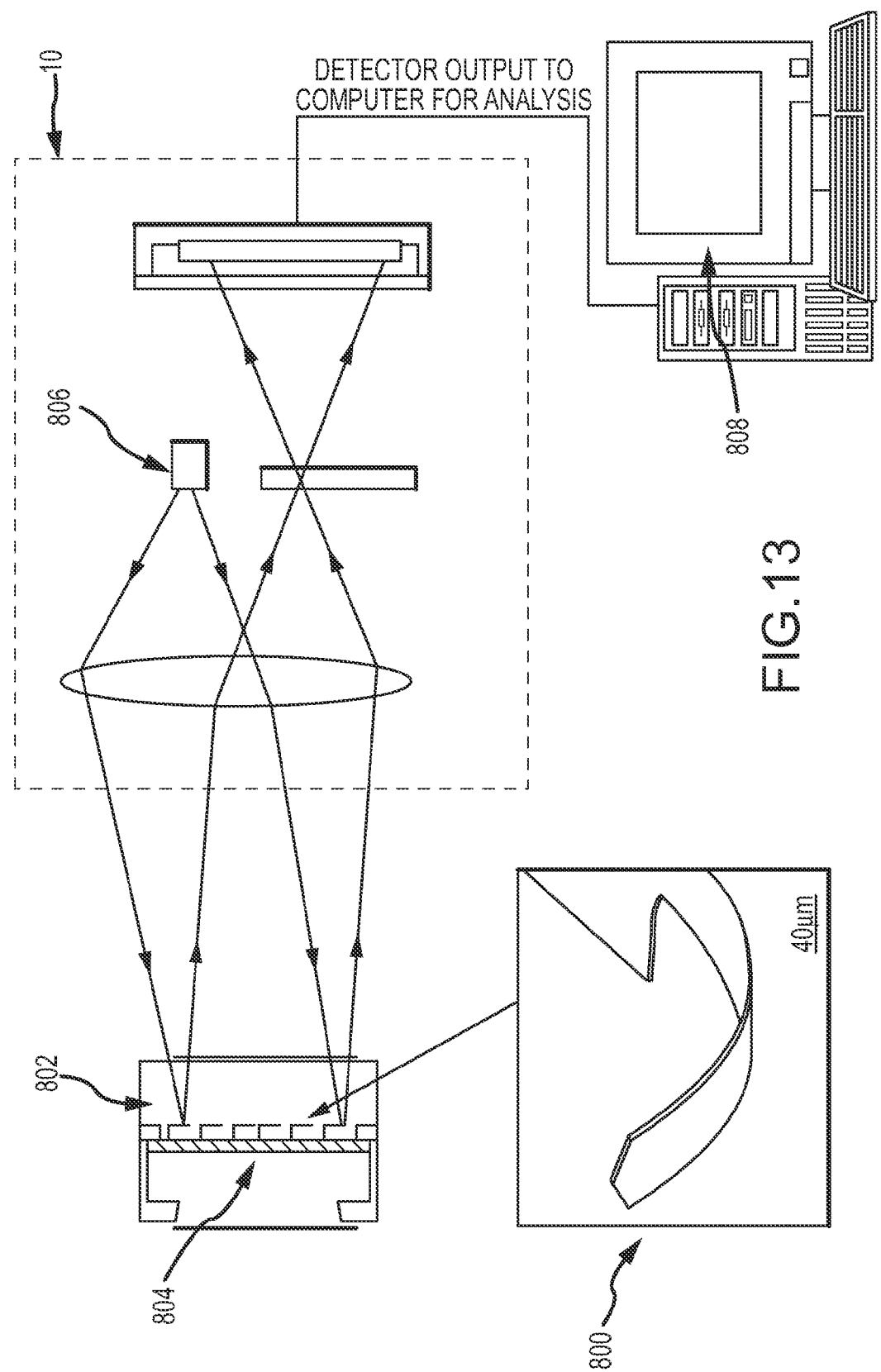
FIG. 13 is a diagram of simultaneous multi-probe atomic force microscopy incorporating the VTF discrete wavefront measurement device.

As illustrated in FIG. 13, discrete waveform sampling device 10 is used to measure tilt angles from multiple probes 800 on a MEMS-based atomic force microscope 802 (AFM) simultaneously used to characterize the surface profile of a sample under test 804. The discrete wavefront measurement device samples the tilt angle from the reflective back of each probe on the AFM in the conjugate object plane defined by the position of the wavefront sensing radiation detection device and focal length of the optic. The discrete "wavefront" is thus defined by the discrete nature of the individual probes. An optical source 806 (e.g. LED, Laser Diode, Laser etc.) must be inserted to illuminate the reflective back of the tilted mirror array. A computer 808 is responsive to the measured local tilts of the wavefront to generate a surface profile of the sample under test. The illumination could be accomplished using the same lens system already in place for imaging and spatial filtering purposes, or another system could be used to collimate the source. It is understood that anyone skilled in the art could modify the illumination scheme without difficulty.

In this embodiment, the second wavefront sensing radiation detection device used for amplitude normalization in the other embodiments is not necessary regardless of any non-uniformities present in the illumination scheme and reflective properties of individual mirrors. Instead, the device can be calibrated without a sample in place, allowing any non-uniformities to be corrected.

Conventionally single AFM probes have been measured with quad and dual cell photodiodes, but the transfer function in these devices severely limits the dynamic range of measurement. In addition the only way to measure multiple probes is in the time domain and does not provide an increase in measurement speed. Other methods have been attempted to provide parallel processing of multiple probes, but all have severe limitations on the number of probes that can be measured. The discrete wavefront sampling device provides a method for optically determining the tilt angle in addition to curvature of multiple AFM probes simultaneously. If the number of pixels measuring a single probe is sufficient, the curvature can be sensed by measuring the amplitude gradient across the image of each probe in the radiation detection device. The only limit in parallel processing of AFM probes is the readout speed of the radiation detection device. With the recent addition of MEMs based AFM probes, large arrays of probes could be measured in parallel leading to several orders of magnitude decrease in sample measurement time. In addition to multiple probe systems, single AFM probe systems would benefit from the tailorable transfer function in the VTF. The traditional dual and quad cell measurement systems provide very little control over the transfer function, while the VTF can be designed to optimize use of the system dynamic range over particular regions of interest. This is accomplished with components of much lower cost than the prior art as well.

Discrete Wavefront Sampling Microscope

Figure 14:
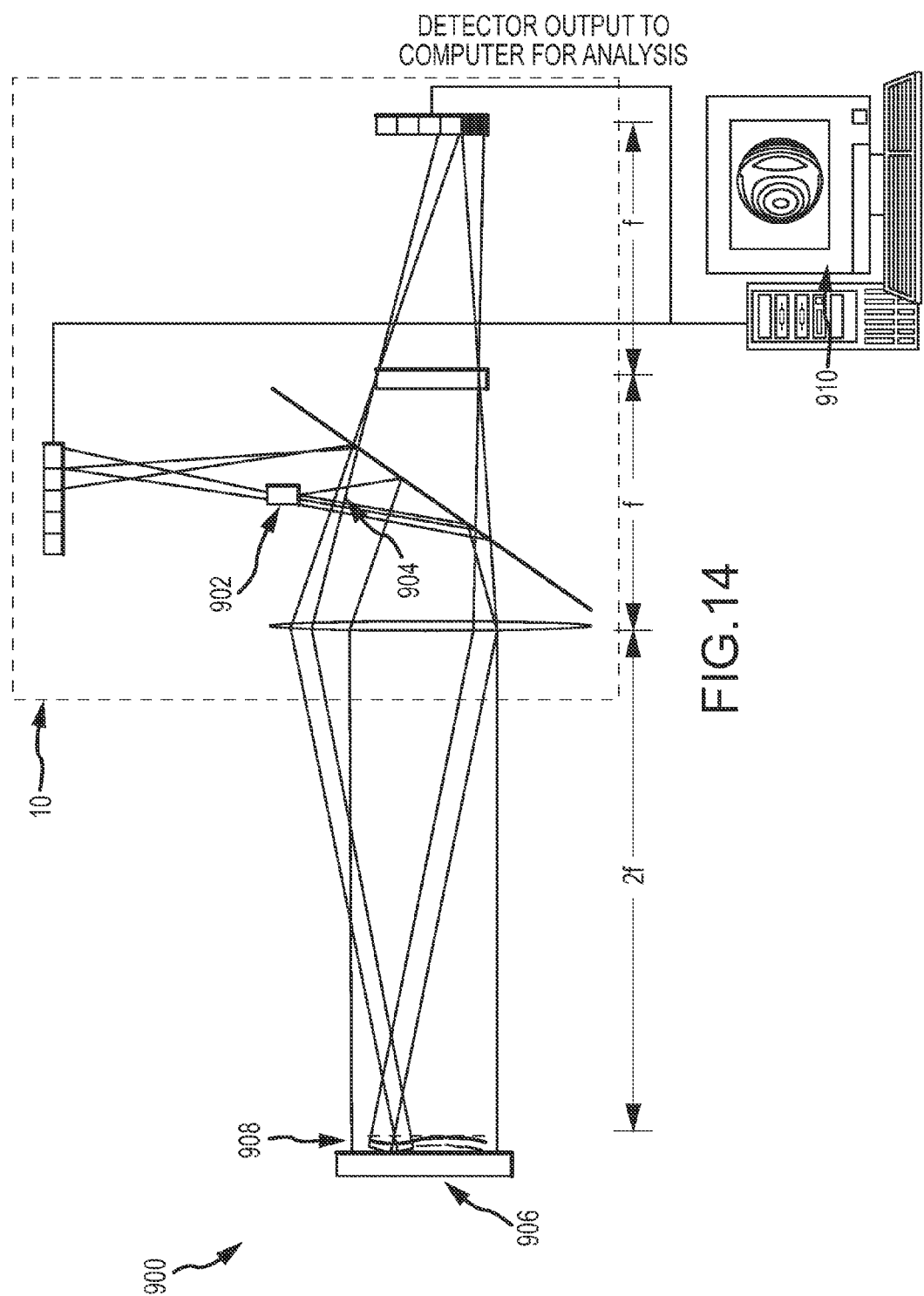
FIG. 14 is a diagram of a discrete wavefront sampling microscope incorporating the VTF discrete wavefront measurement device.

As shown in FIG. 14, a discrete wavefront sampling microscope 900 comprises an optical source 902 that generates an optical beam 904, a sample under test 906 that either reflects the optical beam in accordance with the sample's surface profile or transmits the optical beam in accordance with the samples phase profile to produce the continuous optical wavefront 908, the discrete wavefront sampling device 10 that measures the local tilts and a computer 910 responsive to the measured local tilts to reconstruct the surface or transmissive phase profile of the sample under test. In the reflective configuration, the computer computes the slope of the sample's surface profile and reconstructs the surface profile. If a transmissive sample is measured, the slope of the induced optical phase change from the sample is measured and again the transmitted wavefront can be reconstructed. This measurement is then displayed and can be saved to memory on the computer for further analysis. In addition to measuring the sample at a single optically conjugate position, by translating the detector and sample distance from the optic such that they are still optically conjugate, different spatial resolutions, fields of view of the object, and dynamic range can be obtained in series. This could alternatively be accomplished with the addition of an external zoom lens system. If the sample and/or optical system is then translated in the transverse direction, regions of the sample can be sampled at higher or lower resolution as desired. Conventionally, a Nomarski, or lateral shear interference microscope has been used to obtain similar measurements. The VTF provides an increase in the dynamic range of surface slopes that can be measured. The increased dynamic range of measurement is a key differentiator, allowing a larger range of surface or transmissive phase profiles to be measured simultaneously. This is accomplished with components of much lower cost and reduced sensitivity to polarization effects.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A discrete wavefront measurement device for discretely sampling local tilt across different sub-regions of a continuous optical wavefront at an object plane, comprising:
   an optical system having an effective numerical aperture (NA), said optical system mapping the local tilt of each sub-region of the optical wavefront to a spatial displacement at the back focal plane of the system and imaging a wavefront spatial extent at a conjugate image plane beyond the back focal plane;
   a variable transmission filter (VTF) at or near the back focal plane, said VTF exhibiting a variable amplitude transmission profile over an active region up to a cut-off angle imposed by the NA of the optical system, said VTF attenuating an amplitude of each sub-region of the optical wavefront in accordance with the spatial displacements in the VTF's active region;
   a pixilated detector at the conjugate image plane located at greater than twice the back focal length thereby increasing the cut-off angle, said detector responsive to the attenuated wavefront and discretely reads out the optical intensities across the different sub-regions of the wavefront to quantify the local tilts of each sub-region of the optical wavefront; and
   an afocal wavefront compressor that compresses the wavefront prior to the optical system, said compressor maintaining the sampling of the wavefront over the same spatial extent and spatial sampling resolution at the increased cut-off angle.

2. The discrete wavefront measurement device of claim 1, wherein the detector and VTF have substantially equal diameters and said optical system has an effective diameter that is approximately three times the diameter of the detector.

3. The discrete wavefront measurement device of claim 2, wherein the cut-off angle is approximately the arcsin (⅓*NA).

4. The discrete wavefront measurement device of claim 2, wherein the detector and conjugate image plane is located at approximately twice the back focal length.

5. The discrete wavefront measurement device of claim 1, wherein the detector and conjugate image plane is located at greater than twice the back focal length thereby increasing the cut-off angle.

6. The discrete wavefront measurement device of claim 5, wherein the cut-off angle approaches approximately the arcsin(NA) as the detector moves further from twice the back focal length.

7. The discrete wavefront measurement device of claim 5, further comprising an external zoom lens prior to the optical system, said zoom lens providing dynamic changes in spatial sampling resolution.

8. The discrete wavefront measurement device of claim 1, further comprising an external zoom lens prior to the optical system, said zoom lens providing dynamic changes in spatial sampling resolution.

9. The discrete wavefront measurement device of claim 1, wherein modification of the VTF active region also varies the sub-region optical wavefront tilt angular measurement bandwidth of the device.

10. The discrete wavefront measurement device of claim 1, further comprising:
a translation stage that moves the detector axially with respect to the optical system to change the measureable wavefront spatial extent and a sub-region optical wavefront tilt dynamic range adaptively.

11. The discrete wavefront measurement device of claim 1, further comprising:
a computer responsive to the measured local tilts of the wavefront to compute one or more characteristic parameters of the wavefront and from said parameters to compute a feedback signal; and
an adaptive optic element responsive to the feedback signal to alter the wavefront.

12. The discrete wavefront measurement device of claim 1, further comprising:
an optical source of an optical beam; and
an analog micro-mirror array that reflects and spatially modulates the optical beam to create the optical wavefront.

13. The discrete wavefront measurement device of claim 12, further comprising:
a computer responsive to the measured local tilts of the wavefront to compute one or more characteristic parameters of the wavefront and from said parameters to compute respective feedback signals,
said analog micro-mirror array responsive to the feedback signals to alter the wavefront.

14. The discrete wavefront measurement device of claim 1, further comprising:
a micro-mirror array positioned to selectively alter the local tilts of the respective sub-regions of the wavefront;
a beam-splitter positioned between the VTF and the detector to project an analog image of the wavefront;
a computer responsive to the measured local tilts of the wavefront to compute one or more characteristic parameters of the wavefront and from said parameters to compute respective feedback signals; and
said micro-mirror array responsive to the feedback signals to alter the wavefront.

15. The discrete wavefront measurement device of claim 1, further comprising:
means for measuring the non-uniformity of the wavefront across all of the sub-regions; and
means for compensating the measured local tilts based on the measured non-uniformity.

16. The discrete wavefront measurement device of claim 15, wherein said means for measuring the non-uniformity comprises:
a second pixilated detector;
a beam-splitter positioned between the optical system and the VTF to direct a first portion of the wavefront through the VTF to the detector and a second portion of the wavefront directly to the second pixilated detector to discretely read out optical intensities across the different sub-regions of the wavefront to characterize the non-uniformity at the object plane.

17. The discrete wavefront measurement device of claim 15, wherein said means for measuring the non-uniformity transmits an unmodulated optical wavefront through the optical system and VTF to the detector to discretely read out optical intensities across the different sub-regions of the wavefront to characterize the non-uniformity at the object plane.

18. The discrete wavefront measurement device of claim 1, wherein the optical wavefront emanates from a distant object and is modified by atmospheric induced aberrations, further comprising:
a beam-splitter that splits the wavefront into a first wavefront portion that is directed through the optical system and VTF to the detector and a second wavefront portion;
a computer that discretely reads out optical intensities across the different sub-regions of the first wavefront, compares the measurements to an ideal response for the distant object and computes feedback signals to correct for the atmospheric induced aberrations; and
an adaptive optical element responsive to the feedback signals to compensate the second wavefront portion.

19. The discrete wavefront measurement device of claim 1, further comprising:
a laser that directs a laser beam into a human eye, said beam reflected as the continuous optical wavefront including ocular aberrations; and
a computer that discretely reads out optical intensities across the different sub-regions of the wavefront, compares the measurements to a response for the human eye to measure the ocular aberrations and computes feedback signals to correct for the ocular aberrations at the spatial sampling resolution defined by the detector pitch and optical system magnification.

20. The discrete wavefront measurement device of claim 1, further comprising:
a laser cavity that generates a laser beam that produces the optical wavefront;
a beam-splitter that splits the wavefront into a first wavefront portion that is directed through the optical system and VTF to the detector and a second wavefront portion;
a computer that discretely reads out optical intensities across the different sub-regions of the wavefront, compares the measurements to a desired laser beam profile and computes feedback signals to compensate for differences between the desired and measured beam profiles.

21. The discrete wavefront measurement device of claim 20, wherein the feedback signals are applied to adjust components within the laser cavity.

22. The discrete wavefront measurement device of claim 20, further comprising:
an adaptive optical element responsive to the feedback signals to compensate the second wavefront portion.

23. The discrete wavefront measurement device of claim 1, further comprising:
an IR cantilevered array comprising analog micro-mirrors having an absorptive front surface responsive to IR radiation to selectively tilt the micro-mirrors and a reflective back surface; and
an optical source that illuminates the reflective back surface of the tilted micro-mirrors to produce the optical wavefront,
said detector discretely reading out optical intensities across the different sub-regions of the wavefront to characterize the IR radiation.

24. The discrete wavefront measurement device of claim 1, further comprising:
- an optical source of an optical beam;
- an analog micro-mirror array that reflects and spatially modulates the optical beam to create the optical wavefront;
- a beam-splitter positioned in front of the discrete wavefront measurement device to direct a first portion of the wavefront to the discrete wavefront measurement device to read out the local tilts of the individual micro-mirrors and to project the second portion of the wavefront as an analog image; and
- a computer that compares the measured local tilts to a specified spatial modulation and generates feedback signals,
- said analog micro-mirror array responsive to the feedback signals to alter the deflection of the micro-mirrors to control the optical wavefront.

25. The discrete wavefront measurement device of claim 1, further comprising:
- a sample under test;
- a MEMS-based multi-probe atomic force microscope (AFM) configured to simultaneously probe multiple locations on the sample under test;
- a source that generates an optical beam to illuminate the reflective back side of the multi-probe AFM to produce the optical wavefront, said detector discretely reading out the optical intensities as measurements of both the local tilt and curvature of each said probe; and
- a computer responsive to the measured local tilts of the wavefront to generate a surface profile of the sample under test.

26. The discrete wavefront measurement device of claim 1, further comprising:
- a sample under test;
- a MEMS-based single-probe atomic force microscope (AFM) configured to probe a location on the sample under test;
- a source that generates an optical beam to illuminate the reflective back side of the single-probe AFM to produce the optical wavefront, said detector discretely reading out the optical intensities as measurements of both the local tilt and curvature of the probe; and
- a computer responsive to the measured local tilt of the wavefront to generate a surface profile of the sample under test.

27. The discrete wavefront measurement device of claim 1, further comprising:
- a source that generates an optical beam;
- a sample under test that either reflects the optical beam in accordance with the sample's surface profile or transmits the optical beam in accordance with the samples phase profile to produce the continuous optical wavefront; and
- a computer responsive to the measured local tilts to reconstruct the surface or transmissive phase profile of the sample under test.

28. A discrete wavefront measurement device for discretely sampling local tilt across different sub-regions of a continuous optical wavefront at an object plane, comprising:
- an optical system having an effective numerical aperture (NA), said optical system mapping the local tilt of each sub-region of the optical wavefront to a spatial displacement at the back focal plane of the system and imaging a wavefront spatial extent at a conjugate image plane beyond the back focal plane;
- a variable transmission filter (VTF) at or near the back focal plane, said VTF exhibiting a variable amplitude transmission profile over an active region up to a cut-off angle imposed by the NA of the optical system, said VTF attenuating an amplitude of each sub-region of the optical wavefront in accordance with the spatial displacements in the VTF's active region; and
- a pixilated detector at the conjugate image plane that is responsive to the attenuated wavefront and discretely reads out the optical intensities across the different sub-regions of the wavefront to quantify the local tilts of each sub-region of the optical wavefront,
- wherein the discrete wavefront measurement device substantially decouples spatial sampling resolution, dynamic range and tilt measurement sensitivity, said spatial sampling resolution determined by the spatial resolution of the detector and position of the conjugate image plane, said dynamic range determined by the cut-off angle imposed by the most restrictive of (a) the relationship between the detector size, focal length of the optical system and the position of the conjugate image plane, (b) NA of the optical system and (c) the active region of the VTF, and said tilt measurement sensitivity determined by the ratio of the dynamic range to the resultant minimum resolvable measurement of the VTF and detector.

29. The discrete wavefront measurement device of claim 28, wherein the wavefront spatial sampling resolution is at least 100 um, the dynamic range is at least 2.0 degrees and the tilt measurement sensitivity is at least 100 urad.

30. The discrete wavefront measurement device of claim 28, wherein the wavefront spatial sampling resolution is at least 5 um, the dynamic range is at least 5.0 degrees and the tilt measurement sensitivity is at least 20 urad.

31. A discrete wavefront measurement device for discretely sampling local tilt across different sub-regions of a continuous optical wavefront at an object plane, comprising:
- an optical system having an effective numerical aperture (NA), said optical system mapping the local tilt of each sub-region of the optical wavefront to a spatial displacement at the back focal plane of the system and imaging a wavefront spatial extent at a conjugate image plane beyond the back focal plane;
- a variable transmission filter (VTF) at or near the back focal plane, said VTF exhibiting a variable amplitude transmission profile over an active region up to a cut-off angle imposed by the NA of the optical system, said VTF attenuating an amplitude of each sub-region of the optical wavefront in accordance with the spatial displacements in the VTF's active region;
- a pixilated detector at the conjugate image plane located at greater than twice the back focal length thereby increasing the cut-off angle, said detector responsive to the attenuated wavefront and discretely reads out the optical intensities across the different sub-regions of the wavefront to quantify the local tilts of each sub-region of the optical wavefront; and
- an afocal wavefront expander that expands the wavefront prior to the optical system, said expander increasing the sampling resolution of the wavefront.

32. A discrete wavefront measurement device for discretely sampling local tilt across different sub-regions of a continuous optical wavefront at an object plane, comprising:
- an optical system having an effective numerical aperture (NA), said optical system mapping the local tilt of each sub-region of the optical wavefront to a spatial displacement at the back focal plane of the system and imaging a wavefront spatial extent at a conjugate image plane beyond the back focal plane;

a variable transmission filter (VTF) at or near the back focal plane, said VTF exhibiting a variable amplitude transmission profile over an active region up to a cut-off angle imposed by the NA of the optical system, said VTF attenuating an amplitude of each sub-region of the optical wavefront in accordance with the spatial displacements in the VTF's active region;

a pixilated detector at the conjugate image plane that is responsive to the attenuated wavefront and discretely reads out the optical intensities across the different sub-regions of the wavefront to quantify the local tilts of each sub-region of the optical wavefront;

a computer responsive to the measured local tilts of the wavefront to compute one or more characteristic parameters of the wavefront and from said parameters to compute a feedback signal; and an adaptive optic element responsive to the feedback signal to alter the wavefront, wherein the adaptive optic element comprises a deformable mirror.

* * * * *